(12) United States Patent
Lyu et al.

(10) Patent No.: US 11,586,019 B2
(45) Date of Patent: Feb. 21, 2023

(54) OPTICAL IMAGING SYSTEM INCLUDING SEVEN LENSES OF +−++−+−, +−++++− OR +−+++−− REFRACTIVE POWERS

(71) Applicant: Zhejiang Sunny Optical Co., Ltd, Zhejiang Province (CN)

(72) Inventors: Saifeng Lyu, Zhejiang Province (CN); Mengna Tang, Zhejiang Province (CN); Fujian Dai, Zhejiang Province (CN); Liefeng Zhao, Zhejiang Province (CN)

(73) Assignee: Zhejiang Sunny Optical Co., Ltd., Zhejiang Province (CN)

( * ) Notice: Subject to any disclaimer, the term of this patent is extended or adjusted under 35 U.S.C. 154(b) by 297 days.

(21) Appl. No.: 16/990,447

(22) Filed: Aug. 11, 2020

(65) Prior Publication Data

US 2021/0063699 A1 Mar. 4, 2021

(30) Foreign Application Priority Data

Aug. 28, 2019 (CN) .......................... 201910803293.X

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .................................. G02B 13/0045; G02B 9/64
See application file for complete search history.

(56) References Cited

U.S. PATENT DOCUMENTS 10,317,645 B2 6/2019 Park
10,394,002 B2 8/2019 Huang
(Continued)

FOREIGN PATENT DOCUMENTS

CN 107340588 A 11/2017
CN 206946076 U 1/2018
(Continued)

OTHER PUBLICATIONS

First Office action dated Feb. 25, 2022, in connection with Chinese Patent Application No. 202110834425.2.
(Continued)

*Primary Examiner* — Wen Huang
(74) *Attorney, Agent, or Firm* — Norris McLaughlin, P.A.

(57) ABSTRACT

The present disclosure discloses an optical imaging system. The optical imaging system satisfies: f/EPD≤1.5; 0.3<T23*10/R4<1.8; −0.6<f2/f4<−0.1; and TTL/ImgH<1.4, where f is an effective focal length of the optical imaging system, EPD is an entrance pupil diameter of the optical imaging system, T23 is a spaced interval between the second lens and the third lens along the optical axis, R4 a radius of curvature of an image-side surface of the second lens, f2 is an effective focal length of the second lens, f4 is an effective focal length of the fourth lens, TTL is a distance along the optical axis from an object-side surface of the first lens to an imaging plane of the optical imaging system, and ImgH is half of a diagonal length of an effective pixel area on the imaging plane.

19 Claims, 12 Drawing Sheets

(56) References Cited

U.S. PATENT DOCUMENTS

| | | | |
|---|---|---|---|
| 10,890,737 B2 | 1/2021 | Lee et al. | |
| 11,209,618 B2 | 12/2021 | Fang | |
| 2012/0206627 A1 | 8/2012 | Reshidko et al. | |
| 2019/0025551 A1* | 1/2019 | Kuo | G02B 13/06 |
| 2020/0209544 A1 | 7/2020 | Fang | |
| 2020/0209545 A1 | 7/2020 | Fang | |
| 2020/0209546 A1 | 7/2020 | Zhao et al. | |

FOREIGN PATENT DOCUMENTS

| | | |
|---|---|---|
| CN | 109445076 A | 3/2019 |
| CN | 208636558 U | 3/2019 |
| CN | 109613679 A | 4/2019 |
| CN | 208737089 U | 4/2019 |
| CN | 109709660 A | 5/2019 |
| CN | 109828350 A | 5/2019 |
| CN | 208902953 U | 5/2019 |

OTHER PUBLICATIONS

Second Office action dated Feb. 28, 2022, in connection with Chinese Patent Application No. 202110840960.9.
Translation of Indian Examination Report dated Nov. 25, 2021, in connection with Indian Patent Application No. 202014035303.

\* cited by examiner

OPTICAL IMAGING SYSTEM INCLUDING SEVEN LENSES OF +−++−+−, +−+++− OR +−+++−− REFRACTIVE POWERS

CROSS-REFERENCE TO RELATED APPLICATION

This application claims benefit of priority to Chinese Patent Application No. 201910803293.X filed on Aug. 28, 2019 before the China National Intellectual Property Administration, the entire disclosure of which is incorporated herein by reference in its entity.

TECHNICAL FIELD

The present disclosure relates to an optical imaging system, and more specifically, relates to an optical imaging system including seven lenses.

TECHNICAL FIELD

In recent years, with the upgrading of portable electronic products and the development of functions of image software and video software running on portable electronic products, the market continues to put forward new demands for optical imaging systems suitable for portable electronic products. For example, mobile phones may be used in different scenarios, such as a brighter environment or a darker environment, and the users of the mobile phone expect the optical imaging system of the mobile phone to have better image quality in different environments.

In order to meet the requirements of miniaturization and imaging demands, an optical imaging system that may simultaneously satisfy the characteristics of miniaturization, large aperture, large image plane, high pixels, and excellent image quality is required.

SUMMARY

The present disclosure provides an optical imaging system that is applicable to portable electronic products and at least solves or partially addresses at least one of the above disadvantages of the prior art.

The present disclosure provides an optical imaging system which includes, sequentially from an object side to an image side along an optical axis, a first lens, a second lens, a third lens, a fourth lens, a fifth lens, a sixth lens and a seventh lens. The optical imaging system may satisfy: f/EPD≤1.5, and TTL/ImgH<1.4, where f is an effective focal length of the optical imaging system, EPD is an entrance pupil diameter of the optical imaging system, TTL is a distance along the optical axis from an object-side surface of the first lens to an imaging plane of the optical imaging system, and ImgH is half of a diagonal length of an effective pixel area on the imaging plane.

In one embodiment, the first lens may have positive refractive power, the object-side surface thereof may be a convex surface, and an image-side surface thereof may be a concave surface; the second lens may have negative refractive power, an object-side surface thereof may be a convex surface, and an image-side surface thereof may be a concave surface; the third lens may have positive refractive power; the fourth lens may have positive refractive power, and an object-side surface thereof may be a convex surface; an object-side surface of the sixth lens may be a convex surface, and an image-side surface thereof may be a concave surface; and the seventh lens may have negative refractive power, an object-side surface thereof may be a convex surface, and an image-side surface thereof may be a concave surface.

In one embodiment, the optical imaging system may satisfy: $0.3 < T23*10/R4 < 1.8$, where T23 is a spaced interval between the second lens and the third lens along the optical axis, and R4 is a radius of curvature of an image-side surface of the second lens.

In one embodiment, the optical imaging system may satisfy: $-0.6 < f2/f4 < -0.1$, where f2 is an effective focal length of the second lens, and f4 is an effective focal length of the fourth lens.

In one embodiment, the optical imaging system may satisfy: $0.3 < R11/f < 0.8$, where R11 is a radius of curvature of an object-side surface of the sixth lens, and f is the effective focal length of the optical imaging system.

In one embodiment, the effective focal length f of the optical imaging system and half of a maximal field-of-view Semi-FOV of the optical imaging system may satisfy $f*\tan(\text{Semi-FOV}) > 4.5$ mm.

In one embodiment, a maximum effective radius DT51 of an object-side surface of the fifth lens and a maximum effective radius DT71 of an object-side surface of the seventh lens may satisfy $0.3 < DT51/DT71 < 0.8$.

In one embodiment, a maximum effective radius DT41 of an object-side surface of the fourth lens and a maximum effective radius DT42 of an image-side surface of the fourth lens may satisfy $0.7 < DT41/DT42 < 1.2$.

In one embodiment, SAG61, being an on-axis distance from an intersection of an object-side surface of the sixth lens and the optical axis to a vertex of an effective radius of the object-side surface of the sixth lens, and SAG62, being an on-axis distance from an intersection of an image-side surface of the sixth lens and the optical axis to a vertex of an effective radius of the image-side surface of the sixth lens, may satisfy $0.5 < SAG61/SAG62 < 1$.

In one embodiment, an effective focal length f7 of the seventh lens, a radius of curvature R13 of an object-side surface of the seventh lens and a radius of curvature R14 of an image-side surface of the seventh lens may satisfy $0.1 < (R14-R13)/f7 < 0.6$.

In one embodiment, a radius of curvature R1 of the object-side surface of the first lens and a radius of curvature R2 of an image-side surface of the first lens may satisfy $0.1 < R1/R2 < 0.6$.

In one embodiment, a radius of curvature R3 of an object-side surface of the second lens and a radius of curvature R4 of an image-side surface of the second lens may satisfy $0.1 < (R3-R4)/(R3+R4) < 0.6$.

In one embodiment, the effective focal length f of the optical imaging system and an effective focal length f1 of the first lens may satisfy $0.5 < f/f1 < 1.5$.

In one embodiment, a center thickness CT2 of the second lens along the optical axis, a center thickness CT3 of the third lens along the optical axis, a center thickness CT4 of the fourth lens along the optical axis, and a center thickness CT5 of the fifth lens along the optical axis may satisfy $0.3 < (CT2+CT3)/(CT4+CT5) < 0.8$.

In one embodiment, a center thickness CT1 of the first lens along the optical axis and a center thickness CT6 of the sixth lens along the optical axis may satisfy $0.3 < CT6/CT1 < 0.8$.

In one embodiment, a spaced interval T45 between the fourth lens and the fifth lens along the optical axis and a spaced interval T67 between the sixth lens and the seventh lens along the optical axis may satisfy $0.5 < T45/T67 < 1$.

The present disclosure employs seven lenses, and the optical imaging system has at least one advantageous effect such as large aperture, large image plane, high pixels, high image quality, and miniaturization and the like by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
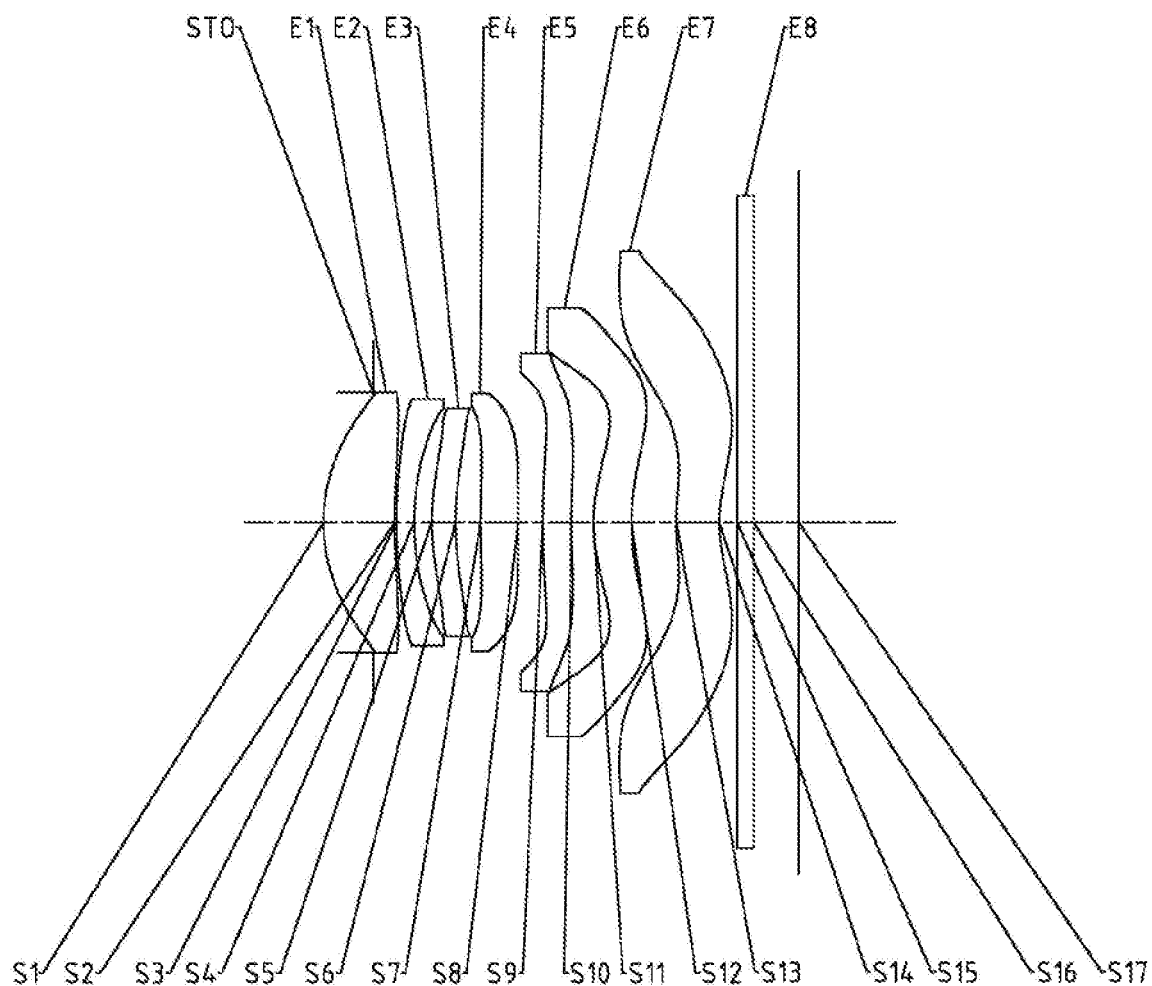
FIG. 1 illustrates a schematic structural view of an optical imaging system according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size, and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, seven lenses having refractive power, which are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, the first lens may have positive refractive power, an object-side surface thereof may be a convex surface, and an image-side surface thereof may be a concave surface. The second lens may have negative refractive power, an object-side surface thereof may be a convex surface, and an image-side surface thereof may be a concave surface. The third lens may have positive refractive power. The fourth lens may have positive refractive power, and an object-side surface thereof may be a convex surface. The sixth lens may have positive or negative refractive power, an object-side surface thereof may be a convex surface, and an image-side surface thereof may be a concave surface. The seventh lens may have negative refractive power, an object-side surface thereof may be a convex surface, and an image-side surface thereof may be a concave surface. By reasonably controlling the positive and negative refractive power of each component and the curvature of each lens's surface in the optical system, the optical imaging system may have the characteristic of miniaturization and good manufacturability, and may better match the photosensitive chip. The optical imaging system provided in the present disclosure has a good imaging effect in different usage scenarios, such as where the object distance changes.

In an exemplary embodiment, the optical imaging system according to the present disclosure may satisfy at least one of the following conditional expressions:

$$f/EPD \leq 1.5 \quad (1);$$

$$0.3 < T23*10/R4 < 1.8 \quad (2);$$

$$-0.6 < f2/f4 < -0.1 \quad (3);$$

$$TTL/ImgH < 1.4 \quad (4); \text{ and}$$

$$0.3 < R11/f < 0.8 \quad (5),$$

where f is an effective focal length of the optical imaging system, EPD is an entrance pupil diameter of the optical imaging system, T23 is a spaced interval between the second lens and the third lens along the optical axis, R4 a radius of curvature of the image-side surface of the second lens, f2 is an effective focal length of the second lens, f4 is an effective focal length of the fourth lens, TTL is a distance along the optical axis from the object-side surface of the first lens to an imaging plane of the optical imaging system, ImgH is half of a diagonal length of an effective pixel area on the imaging plane, and R11 is a radius of curvature of the object-side surface of the sixth lens.

In an exemplary embodiment, the optical imaging system according to the present disclosure may satisfy the conditional expression (1). By controlling the ratio of the effective focal length of the optical imaging system to entrance pupil diameter of the optical imaging system, it is beneficial to make the optical imaging system have a large aperture.

In an exemplary embodiment, the optical imaging system according to the present disclosure may satisfy the conditional expression (4). More specifically, the distance TTL along the optical axis from the object-side surface of the first lens to the imaging plane of the optical imaging system and ImgH, being half of the diagonal length of the effective pixel area on the imaging plane, may satisfy: 1.30<TTL/ImgH<1.39. By controlling the ratio of the total optical length to the image height of the optical imaging system, it is beneficial to make the optical imaging system have the characteristic of miniaturization. As an example, when the optical imaging system of the present disclosure further satisfies the conditional expression f/EPD≤1.5, it is beneficial for the imaging plane to obtain more image information when the optical imaging system is in use, so that the optical imaging system has a good imaging effect in different scenarios, for example, the imaging effect in a dark environment is improved.

In an exemplary embodiment, the optical imaging system according to the present disclosure may satisfy the conditional expression (3). More specifically, the effective focal length f2 of the second lens and the effective focal length f4 of the fourth lens may satisfy: −0.42<f2/f4<−0.14. By controlling the ratio of the effective focal length of the second lens to the effective focal length of the fourth lens, the second lens may be better matched with the fourth lens. As an example, when the optical imaging system further satisfies the conditional expressions (1) and (4), the optical imaging system has good image quality.

In an exemplary embodiment, the optical imaging system according to the present disclosure may satisfy the conditional expression (2). More specifically, the spaced interval T23 between the second lens and the third lens along the optical axis and the radius of curvature R4 of the image-side surface of the second lens may satisfy: 0.43<T23*10/R4<1.66. By controlling the air interval between the second lens and the third lens and the radius of curvature on the corresponding surface of the second lens, the image quality of the optical imaging system may be improved. As an example, when the optical imaging system further satisfies the conditional expressions (1), (3), and (4), a larger aperture has a higher light transmission capability, and the optical imaging system may effectively weaken the ghost image generated by the light.

In an exemplary embodiment, the optical imaging system according to the present disclosure may satisfy the conditional expression (5). More specifically, the radius of curvature R11 of the object-side surface of the sixth lens and the effective focal length f of the optical imaging system may satisfy: 0.4<R11/f<0.6. By controlling the ratio of the radius of curvature of the object side surface of the sixth lens to the effective focal length of the optical imaging system, it is beneficial to weaken the light angle at the sixth lens. When the optical imaging system further satisfies the conditional expressions (1), (3) and (4), the optical imaging system may reduce ghost images caused by large-angle light, and the optical imaging system has good image quality in both close-range shooting mode and long-range shooting mode.

In an exemplary embodiment, the optical imaging system according to the present disclosure may satisfy: f*tan(Semi-FOV)>4.5 mm, where f is an effective focal length of the optical imaging system, and Semi-FOV is half of a maximal field-of-view of the optical imaging system. More specifically, f and Semi-FOV may satisfy: 4.8 mm<f*tan(Semi-FOV)<4.9. Controlling the effective focal length and maximum field-of-view of the optical imaging system is beneficial to make the optical imaging system have a large image plane. When the optical imaging system is used for shooting, the optical imaging system with large imaging plane may obtain more image information, so that the optical imaging system may show more image details. In addition, it is also beneficial to improve the image quality of the optical imaging system in night shooting scenarios.

In an exemplary embodiment, the optical imaging system according to the present disclosure may satisfy: 0.3<DT51/DT71<0.8, where DT51 is a maximum effective radius of an object-side surface of the fifth lens, and DT71 is a maximum effective radius of the object-side surface of the seventh lens. More specifically, DT51 and DT71 may satisfy: 0.53<DT51/DT71<0.62. By controlling the maximum effective radius of the object-side surface of the fifth lens and the maximum effective radius of the object-side surface of the seventh lens, the optical aperture of the optical imaging system may be reasonably distributed, which is beneficial to the compactness of the optical imaging system, guarantee the stability of the assembly process, and effectively avoid problems, such as excessive aperture deviation between lenses and uneven assembly force caused by unreasonable aperture distribution.

In an exemplary embodiment, the optical imaging system according to the present disclosure may satisfy: 0.7<DT41/DT42<1.2, where DT41 is a maximum effective radius of the object-side surface of the fourth lens, and DT42 is a maximum effective radius of an image-side surface of the fourth lens. More specifically, DT41 and DT42 may satisfy: 0.87<DT41/DT42<0.92. By controlling the ratio of the maximum effective radius of the object-side surface of the fourth lens to the maximum effective radius of the image-side surface of the fourth lens, it is beneficial to make the optical imaging system have a compact structure, thereby maintaining a stable process during assembly and manufacturing of the optical imaging system. In addition, it may also avoid excessive light deflection at the object-side surface of the fourth lens.

In an exemplary embodiment, the optical imaging system according to the present disclosure may satisfy: 0.5<SAG61/SAG62<1, where SAG61 is an on-axis distance from an intersection of the object-side surface of the sixth lens and the optical axis to a vertex of an effective radius of the object-side surface of the sixth lens, and SAG62 is an on-axis distance from an intersection of the image-side surface of the sixth lens and the optical axis to a vertex of an effective radius of the image-side surface of the sixth lens. More specifically, SAG61 and SAG62 may satisfy: 0.58<SAG61/SAG62<0.99. By controlling the ratio of the sagittal height of the object-side surface of the sixth lens to the sagittal height of the image-side surface of the sixth lens, it is beneficial to control the shape of the sixth lens. As an example, where the optical imaging system is an optical imaging system with a large image plane and a large aperture, it is beneficial to make the sixth lens have a uniform transition surface shape, so that the sixth lens has good molding characteristic.

In an exemplary embodiment, the optical imaging system according to the present disclosure may satisfy: 0.1<(R14−R13)/f7<0.6, where f7 is an effective focal length of the seventh lens, R13 is a radius of curvature of the object-side surface of the seventh lens, and R14 is a radius of curvature of the image-side surface of the seventh lens. More specifically, f7, R13 and R14 may satisfy: 0.15<(R14−R13)/f7<0.4. By controlling the effective focal length of the seventh lens and the radii of curvature of the two sides of the seventh lens, it is beneficial to make the chief ray angle of the optical imaging system suitable for matching the photosensitive chip. In addition, the optical imaging system has better image quality under different object distances.

In an exemplary embodiment, the optical imaging system according to the present disclosure may satisfy: 0.1<R1/R2<0.6, where R1 is a radius of curvature of the object-side surface of the first lens, and R2 is a radius of curvature of the image-side surface of the first lens. More specifically, R1 and R2 may satisfy: 0.22<R1/R2<0.41. By controlling the ratio of the radius of curvature of the object-side surface of the first lens to the radius of curvature of the image-side surface of the first lens, it is beneficial to reduce the intensity of the ghost image caused by the total reflection of the light inside the first lens, thereby improving the image quality of the optical imaging system.

In an exemplary embodiment, the optical imaging system according to the present disclosure may satisfy: 0.1<(R3−R4)/(R3+R4)<0.6, where R3 is a radius of curvature of the object-side surface of the second lens, and R4 is a radius of curvature of the image-side surface of the second lens. More specifically, R3 and R4 may satisfy: 0.13<(R3−R4)/(R3+R4)<0.51. By controlling the radius of curvature of the object-side surface of the second lens and the radius of curvature of the image-side surface of the second lens, the intensity of the ghost image caused by the total reflection of the light at the air interval between the first lens and the second lens may be reduced. At the same time, it is beneficial to correct the chromatic aberration and spherical aberration of the optical imaging system, thereby improving the image quality of the optical imaging system.

In an exemplary embodiment, the optical imaging system according to the present disclosure may satisfy: 0.5<f/f1<1.5, where f is an effective focal length of the optical imaging system, and f1 is an effective focal length of the first lens. More specifically, f and f1 may satisfy: 0.7<f/f1<1.0. By controlling the ratio of the effective focal length of the optical imaging system to the effective focal length of the first lens, it is beneficial to reduce the intensity of the ghost image caused by the total reflection of the light inside the first lens, and reduce the sensitivity of the first lens.

In an exemplary embodiment, the optical imaging system according to the present disclosure may satisfy: 0.3<(CT2+CT3)/(CT4+CT5)<0.8, where CT2 is a center thickness of the second lens along the optical axis, CT3 is a center thickness of the third lens along the optical axis, CT4 is a center thickness of the fourth lens along the optical axis, and CT5 is a center thickness of the fifth lens along the optical axis. More specifically, CT2, CT3, CT4 and CT5 may satisfy: 0.49<(CT2+CT3)/(CT4+CT5)<0.70. By controlling the center thicknesses of the second lens to the fourth lens along the optical axis, each lens has good molding characteristic, and the assembled lenses are relatively matched, which may make full use of the internal space of the optical imaging system. At the same time, the degree of light deflection at the aforementioned lenses may also be reduced, thereby reducing the sensitivity of each lens.

In an exemplary embodiment, the optical imaging system according to the present disclosure may satisfy: 0.3<CT6/CT1<0.8, where CT1 is a center thickness of the first lens along the optical axis, and CT6 is a center thickness of the sixth lens along the optical axis. More specifically, CT1 and CT6 may satisfy: 0.46<CT6/CT1<0.76. By reasonably configuring the center thickness of the first lens with the center thickness of the sixth lens, it is beneficial to make full use of the space inside the optical imaging system. In addition, it is also beneficial to make each lens have good molding characteristic.

In an exemplary embodiment, the optical imaging system according to the present disclosure may satisfy: 0.5<T45/T67<1, where T45 is a spaced interval between the fourth lens and the fifth lens along the optical axis, and T67 is a spaced interval between the sixth lens and the seventh lens along the optical axis. More specifically, T45 and T67 may satisfy: 0.53<T45/T67<0.81. By reasonably configuring the air interval between the fourth lens to the fifth lens and the air interval between the sixth lens and the seventh lens, it is beneficial to reduce the degree of light deflection in the optical imaging system and reduce the sensitivity of the optical imaging system. In addition, by doing so, the optical imaging system may have good image quality in the macro shooting mode.

In an exemplary embodiment, the optical imaging system described above may further include at least one stop. The stop may be disposed at an appropriate position as needed, for example, between the object side and the first lens. Optionally, the above optical imaging system may further include an optical filter for correcting the color deviation and/or a protective glass for protecting the photosensitive element located on an imaging plane.

The optical imaging system according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure also has excellent optical properties such as large aperture, large image plane, high pixels, high image quality, and miniaturization.

In the embodiments of the present disclosure, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, all the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking seven lenses as an example, the optical imaging system is not limited to include seven lenses. The optical imaging system may also include other numbers of lenses if desired.

Some specific examples of an optical imaging system applicable to the above embodiment will be further described below with reference to the accompanying drawings.

EXAMPLE 1

An optical imaging system according to example 1 of the present disclosure is described below with reference to FIG. 1 to FIG. 2D. FIG. 1 shows a schematic structural view of the optical imaging system according to example 1 of the present disclosure.

As shown in FIG. 1, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

Table 1 is a table illustrating basic parameters of the optical imaging system of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7029 | | | | |
| S1 | Aspheric | 2.4637 | 1.0057 | 1.55 | 55.9 | 5.71 | −0.0332 |
| S2 | Aspheric | 10.0231 | 0.0302 | | | | 0.0000 |
| S3 | Aspheric | 7.8780 | 0.2469 | 1.67 | 20.4 | −10.62 | −0.5478 |

TABLE 1-continued

| Surface number | Surface type | Radius of curvature | Thickness/ Distance | Material Refractive index | Abbe number | Focal length | Conic coefficient |
|---|---|---|---|---|---|---|---|
| S4 | Aspheric | 3.6831 | 0.2512 | | | | 0.7161 |
| S5 | Aspheric | 3.6057 | 0.3342 | 1.65 | 23.5 | 31.07 | −0.5420 |
| S6 | Aspheric | 4.2376 | 0.3585 | | | | −1.3951 |
| S7 | Aspheric | 17.8066 | 0.5297 | 1.55 | 56.1 | 29.91 | −20.0000 |
| S8 | Aspheric | −194.5402 | 0.4001 | | | | 2.5000 |
| S9 | Aspheric | 12.9810 | 0.4046 | 1.55 | 56.1 | −37.58 | 24.7256 |
| S10 | Aspheric | 7.8624 | 0.2622 | | | | −8.4825 |
| S11 | Aspheric | 2.3181 | 0.5382 | 1.65 | 23.5 | 10.74 | −5.3331 |
| S12 | Aspheric | 3.1677 | 0.6332 | | | | −6.1534 |
| S13 | Aspheric | 3.6722 | 0.6078 | 1.55 | 56.1 | −9.12 | −0.4105 |
| S14 | Aspheric | 1.9902 | 0.2538 | | | | −6.7461 |
| S15 | Spherical | Infinite | 0.2368 | 1.52 | 64.2 | | |
| S16 | Spherical | Infinite | 0.6346 | | | | |
| S17 | Spherical | Infinite | | | | | |

In example 1, an effective focal length f of the optical imaging system is 5.43 mm, an on-axis distance TTL from the object-side surface S1 of the first lens E1 to the imaging plane S17 is 6.73 mm, half of a diagonal length ImgH of an effective pixel area on the imaging plane S17 is 4.92 mm, and half of a maximal field-of-view Semi-FOV is 41.8°.

In example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \qquad (6)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 2

| Surface number | A4 | A6 | A8 | A10 | A12 |
|---|---|---|---|---|---|
| S1 | −5.3460E−02 | −1.9535E−02 | −6.6662E−03 | −1.4965E−03 | −3.0367E−04 |
| S2 | −1.3574E−01 | −7.7823E−03 | −2.5421E−03 | −3.8507E−03 | −4.0368E−04 |
| S3 | −2.9462E−03 | 1.7275E−02 | 3.8505E−03 | −1.5924E−03 | −6.7674E−04 |
| S4 | −4.5970E−03 | 1.2393E−02 | 4.9142E−03 | 3.1151E−03 | 5.6339E−04 |
| S5 | −1.8642E−01 | 9.1796E−03 | 1.1554E−02 | 5.9882E−03 | 1.0089E−03 |
| S6 | −1.1624E−01 | 7.8440E−03 | 7.9338E−03 | 3.6736E−03 | 6.9572E−04 |
| S7 | −2.0306E−01 | −2.5670E−02 | −1.9613E−03 | 5.3690E−04 | −5.8692E−04 |
| S8 | −3.3144E−01 | −4.3660E−02 | −3.6299E−03 | −4.7003E−04 | 2.3711E−04 |
| S9 | −5.5208E−01 | −1.2561E−01 | 1.6525E−02 | 1.9801E−02 | 3.4649E−03 |
| S10 | −6.8695E−01 | 8.0888E−02 | 7.9653E−04 | 1.5362E−02 | −7.7337E−03 |
| S11 | −1.4131E+00 | −8.7606E−02 | 7.1858E−02 | 2.3472E−02 | −6.9967E−03 |
| S12 | −1.5302E+00 | 5.7848E−02 | 7.7983E−02 | −2.0955E−02 | −1.5713E−02 |
| S13 | −3.6322E+00 | 1.1343E+00 | −3.9592E−01 | 1.0316E−01 | −2.2306E−02 |
| S14 | −2.7403E+00 | 5.5538E−01 | −1.5216E−01 | 5.6898E−02 | −5.8388E−03 |

| Surface number | A14 | A16 | A18 | A20 |
|---|---|---|---|---|
| S1 | 4.0779E−05 | −2.0194E−05 | 1.6066E−06 | −2.3594E−05 |
| S2 | −3.9567E−04 | −2.9716E−04 | 4.8979E−05 | −2.9272E−05 |
| S3 | −1.8093E−04 | −2.8412E−04 | 1.5225E−05 | −3.7326E−06 |
| S4 | 9.6601E−05 | −2.1650E−04 | −1.3797E−04 | −6.4933E−05 |
| S5 | −1.4718E−04 | −2.1112E−04 | −9.1393E−05 | −1.9075E−05 |
| S6 | 1.1225E−06 | −4.2254E−05 | −1.4960E−05 | −2.6151E−06 |
| S7 | −1.0626E−03 | −7.4560E−04 | −3.3840E−04 | −1.1062E−04 |
| S8 | 3.2325E−05 | 9.8800E−05 | 9.0461E−05 | 5.6902E−05 |
| S9 | −1.4698E−03 | −1.4858E−03 | −5.6161E−04 | −1.6035E−04 |
| S10 | −1.3677E−03 | −2.6960E−04 | 6.7455E−04 | −8.3568E−05 |
| S11 | −5.2624E−03 | −3.2533E−03 | 3.7884E−04 | 3.1160E−04 |
| S12 | 2.0430E−03 | 6.5173E−04 | 2.4264E−03 | −9.8542E−04 |
| S13 | 1.0748E−02 | −7.0119E−03 | 2.7819E−03 | −4.5489E−04 |
| S14 | 2.9167E−03 | −7.0692E−03 | 2.7394E−03 | 4.1512E−04 |

Figure 2A:
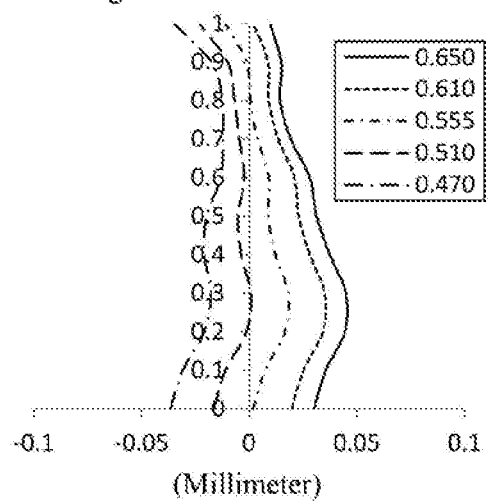
FIGS. 2A to 2D illustrate a longitudinal aberration curve, an astigmatic curve, a distortion curve, and a lateral color curve of the optical imaging system of the Example 1, respectively.
Figure 2B:
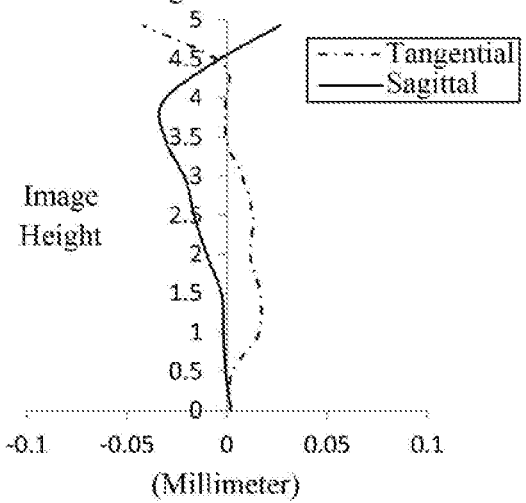
Figures 2C, 2D:
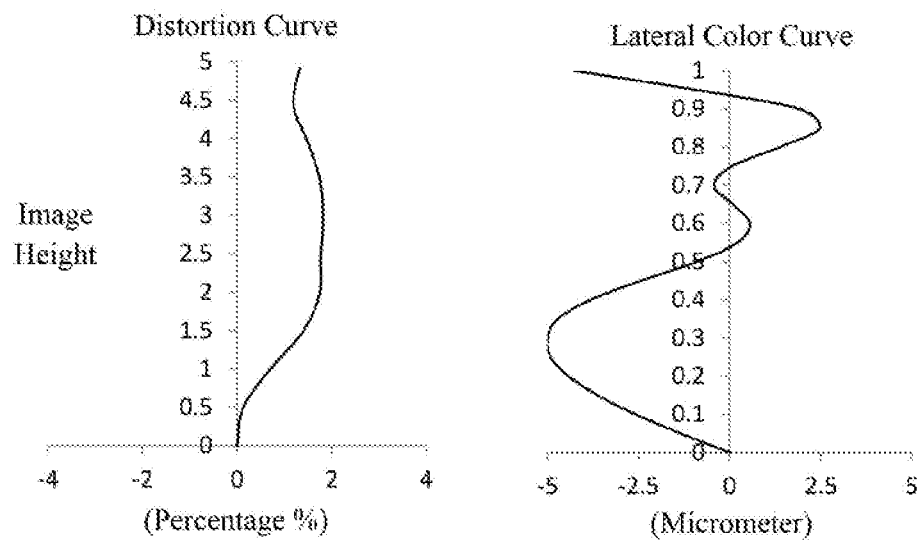

FIG. 2A illustrates a longitudinal aberration curve of the optical imaging system according to example 1, representing deviations of focal points converged by light of different wavelengths after passing through the optical imaging system. FIG. 2B illustrates an astigmatic curve of the optical imaging system according to example 1, representing a curvature of a tangential plane and a curvature of a sagittal plane. FIG. 2C illustrates a distortion curve of the optical imaging system according to example 1, representing amounts of distortion at different image heights. FIG. 2D illustrates a lateral color curve of the optical imaging system according to example 1, representing deviations of different image heights on an imaging plane after light passes through the optical imaging system. It can be seen from FIG. 2A to FIG. 2D that the optical imaging system provided in example 1 may achieve good image quality.

EXAMPLE 2

Figure 3:
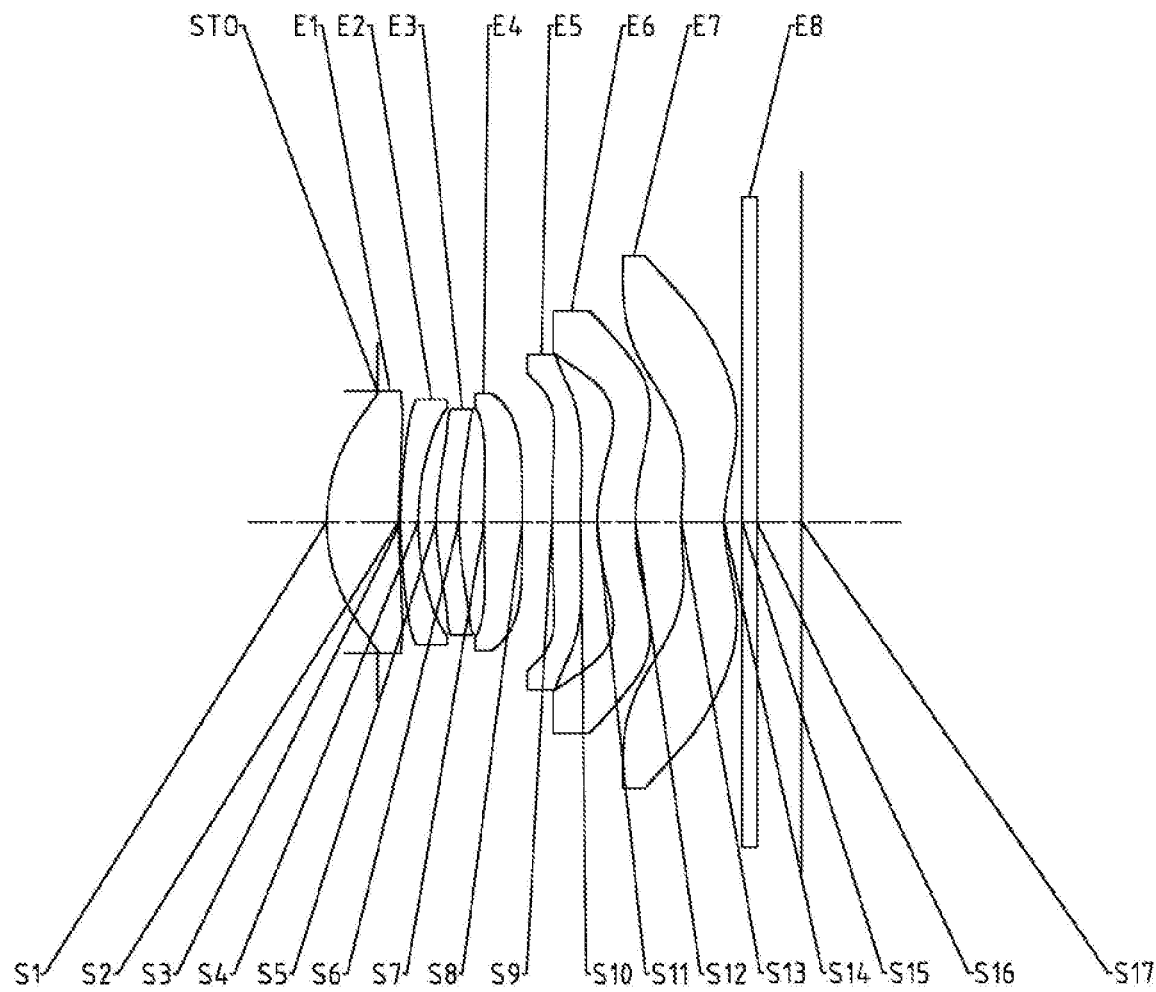
FIG. 3 illustrates a schematic structural view of an optical imaging system according to Example 2 of the present disclosure.

An optical imaging system according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 2, an effective focal length f of the optical imaging system is 5.41 mm, an on-axis distance TTL from the object-side surface S1 of the first lens E1 to the imaging plane S17 is 6.70 mm, half of a diagonal length ImgH of an effective pixel area on the imaging plane S17 is 4.92 mm, and half of a maximal field-of-view Semi-FOV is 41.9°.

Table 3 is a table illustrating basic parameters of the optical imaging system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (6) given in the above example 1.

TABLE 3

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.7156 | | | | |
| S1 | Aspheric | 2.4561 | 1.0146 | 1.55 | 55.9 | 5.68 | −0.0377 |
| S2 | Aspheric | 10.0589 | 0.0300 | | | | 0.0000 |
| S3 | Aspheric | 7.8060 | 0.2457 | 1.67 | 20.4 | −10.62 | −0.6215 |
| S4 | Aspheric | 3.6663 | 0.2539 | | | | 0.7541 |
| S5 | Aspheric | 3.5250 | 0.3200 | 1.65 | 23.5 | 31.16 | −0.6504 |
| S6 | Aspheric | 4.1232 | 0.3560 | | | | −1.6256 |
| S7 | Aspheric | 18.4458 | 0.5393 | 1.55 | 56.1 | 28.10 | −20.0000 |
| S8 | Aspheric | −90.1811 | 0.4162 | | | | −9.4560 |
| S9 | Aspheric | 15.7863 | 0.4012 | 1.55 | 56.1 | −31.40 | 25.0000 |
| S10 | Aspheric | 8.1440 | 0.2391 | | | | −14.2571 |
| S11 | Aspheric | 2.3023 | 0.5374 | 1.65 | 23.5 | 10.20 | −5.4719 |
| S12 | Aspheric | 3.2184 | 0.6463 | | | | −6.1507 |
| S13 | Aspheric | 3.6356 | 0.6047 | 1.55 | 56.1 | −8.61 | −0.4103 |
| S14 | Aspheric | 1.9299 | 0.2523 | | | | −6.9655 |
| S15 | Spherical | Infinite | 0.2100 | 1.52 | 64.2 | | |
| S16 | Spherical | Infinite | 0.6332 | | | | |
| S17 | Spherical | Infinite | | | | | |

TABLE 4

| Surface number | A4 | A6 | A8 | A10 | A12 |
|---|---|---|---|---|---|
| S1 | −5.7761E−02 | −2.1195E−02 | −7.1662E−03 | −1.5683E−03 | −3.2356E−04 |
| S2 | −1.1195E−01 | −3.4217E−03 | 7.5987E−04 | −2.2756E−03 | 3.3767E−04 |
| S3 | −3.1619E−03 | 1.7363E−02 | 4.1165E−03 | −1.6363E−03 | −3.3442E−04 |

TABLE 4-continued

| | | | | |
|---|---|---|---|---|
| S4 | −3.2552E−03 | 1.2017E−02 | 4.6562E−03 | 3.1216E−03 | 6.8240E−04 |
| S5 | −1.8718E−01 | 8.7470E−03 | 1.0846E−02 | 5.7644E−03 | 9.8623E−04 |
| S6 | −1.1765E−01 | 7.8103E−03 | 8.0842E−03 | 3.8796E−03 | 8.1244E−04 |
| S7 | −1.6156E−01 | −1.8820E−02 | −5.8233E−04 | 1.6499E−03 | 8.1581E−04 |
| S8 | −3.2304E−01 | −4.3696E−02 | −4.1329E−03 | −4.3612E−04 | 5.7262E−05 |
| S9 | −3.8274E−01 | −9.9781E−02 | −8.3847E−04 | 1.0753E−02 | 3.1090E−03 |
| S10 | −7.1317E−01 | 8.9659E−02 | 1.7340E−03 | 1.5989E−02 | −8.7940E−03 |
| S11 | −1.2587E+00 | −1.0077E−01 | 4.9442E−02 | 2.2994E−02 | −1.2704E−03 |
| S12 | −1.5379E+00 | 6.2563E−02 | 7.8425E−02 | −2.1815E−02 | −1.5216E−02 |
| S13 | −3.6189E+00 | 1.1346E+00 | −3.9885E−01 | 1.0389E−01 | −2.2426E−02 |
| S14 | −2.7757E+00 | 5.7460E−01 | −1.6166E−01 | 5.8634E−02 | −6.3953E−03 |

| Surface number | A14 | A16 | A18 | A20 |
|---|---|---|---|---|
| S1 | 4.7200E−05 | −2.3208E−05 | 5.7049E−06 | −2.3405E−05 |
| S2 | −6.1626E−05 | −1.4681E−04 | 4.5378E−05 | −1.8591E−05 |
| S3 | −1.5735E−04 | −2.4156E−04 | 3.1196E−05 | −3.7915E−06 |
| S4 | 1.4059E−04 | −2.0271E−04 | −1.3303E−04 | −6.1376E−05 |
| S5 | −1.3184E−04 | −2.0700E−04 | −8.4156E−05 | −1.3038E−05 |
| S6 | 3.5630E−05 | −5.3885E−05 | −3.3933E−05 | −1.2158E−05 |
| S7 | 1.4227E−04 | −4.8353E−05 | −4.3473E−05 | −2.6660E−05 |
| S8 | −8.1527E−05 | −5.1916E−06 | 2.2324E−05 | 3.0415E−05 |
| S9 | 3.1839E−04 | −3.8347E−04 | −1.1042E−04 | −7.7567E−05 |
| S10 | −1.5926E−03 | −3.0470E−04 | 8.7019E−04 | −1.0711E−04 |
| S11 | −1.5692E−03 | −2.3859E−03 | 1.5431E−04 | 2.0601E−04 |
| S12 | 2.7276E−03 | 1.2477E−03 | 2.6378E−03 | −1.0120E−03 |
| S13 | 1.0823E−02 | −7.0132E−03 | 2.8397E−03 | −4.8528E−04 |
| S14 | 2.2799E−03 | −6.9221E−03 | 3.3639E−03 | 6.5837E−04 |

Figure 4A:
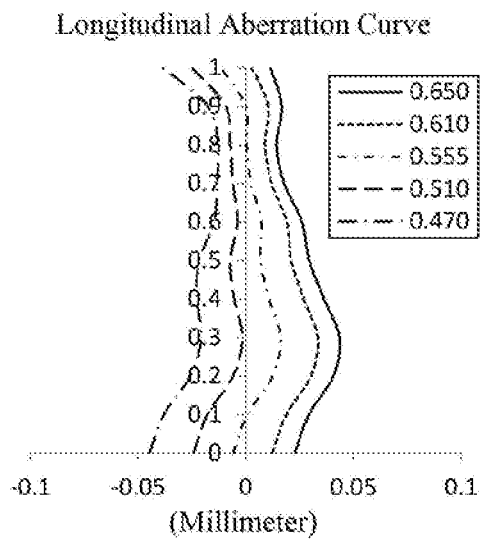
FIGS. 4A to 4D illustrate a longitudinal aberration curve, an astigmatic curve, a distortion curve, and a lateral color curve of the optical imaging system of the Example 2, respectively.
Figure 4B:
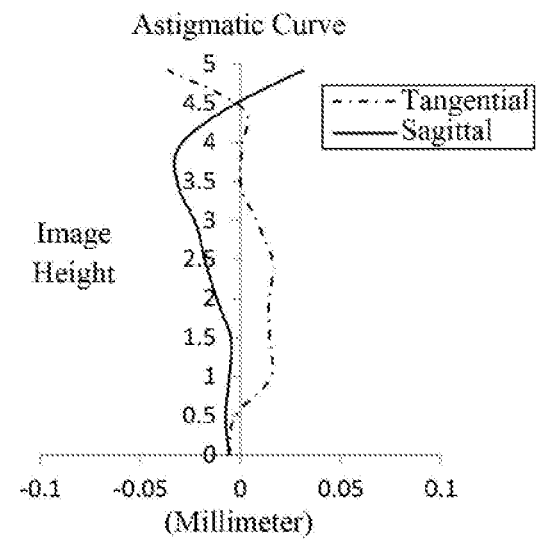
Figure 4C:
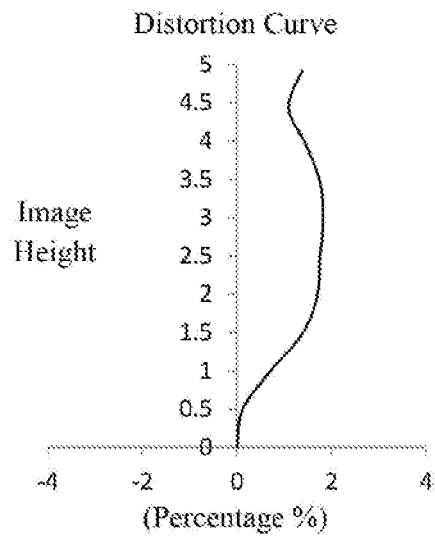
Figure 4D:
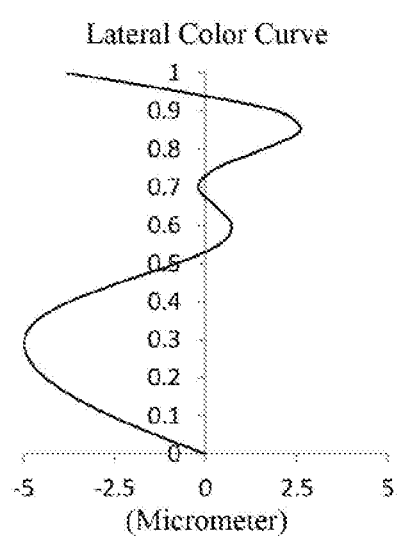

FIG. 4A illustrates a longitudinal aberration curve of the optical imaging system according to example 2, representing deviations of focal points converged by light of different wavelengths after passing through the optical imaging system. FIG. 4B illustrates an astigmatic curve of the optical imaging system according to example 2, representing a curvature of a tangential plane and a curvature of a sagittal plane. FIG. 4C illustrates a distortion curve of the optical imaging system according to example 2, representing amounts of distortion corresponding to different image heights. FIG. 4D illustrates a lateral color curve of the optical imaging system according to example 2, representing deviations of different image heights on an imaging plane after light passes through the optical imaging system. It can be seen from FIG. 4A to FIG. 4D that the optical imaging system provided in example 2 may achieve good image quality.

EXAMPLE 3

Figure 5:
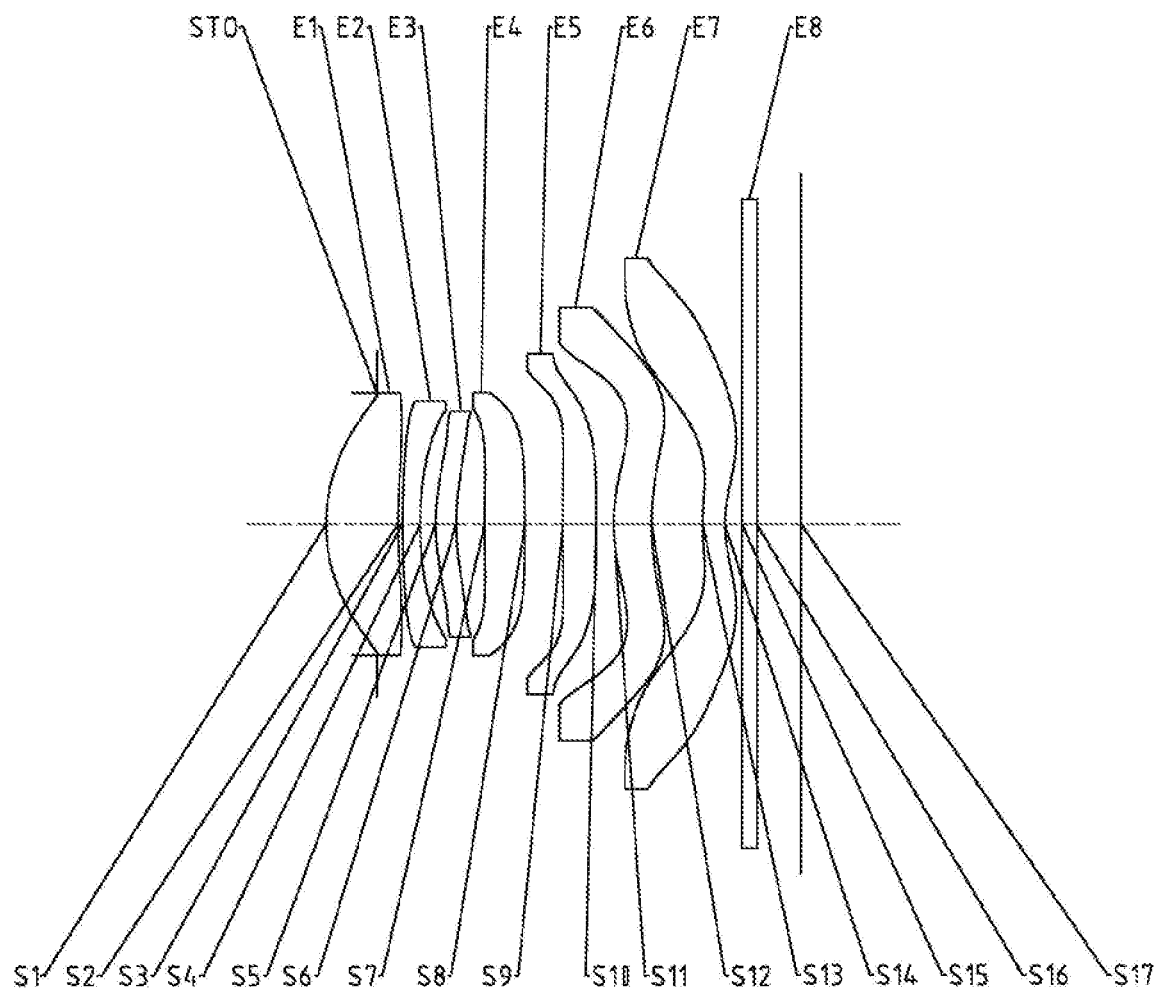
FIG. 5 illustrates a schematic structural view of an optical imaging system according to Example 3 of the present disclosure.

An optical imaging system according to example 3 of the present disclosure is described below with reference to FIG. 5 to FIG. 6D. FIG. 5 shows a schematic structural view of the optical imaging system according to example 3 of the present disclosure.

As shown in FIG. 5, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 3, an effective focal length f of the optical imaging system is 5.41 mm, an on-axis distance TTL from the object-side surface S1 of the first lens E1 to the imaging plane S17 is 6.70 mm, half of a diagonal length ImgH of an effective pixel area on the imaging plane S17 is 4.92 mm, and half of a maximal field-of-view Semi-FOV is 41.9°.

Table 5 is a table illustrating basic parameters of the optical imaging system of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (6) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7162 | | | | |
| S1 | Aspheric | 2.4513 | 1.0142 | 1.55 | 55.9 | 6.09 | −0.0300 |
| S2 | Aspheric | 7.9291 | 0.0674 | | | | 0.0000 |
| S3 | Aspheric | 13.5960 | 0.2457 | 1.67 | 20.4 | −11.56 | 22.0142 |
| S4 | Aspheric | 4.8855 | 0.2181 | | | | 3.3420 |
| S5 | Aspheric | 3.1770 | 0.2900 | 1.65 | 23.5 | 26.90 | −1.7298 |
| S6 | Aspheric | 3.7505 | 0.4002 | | | | −2.6020 |
| S7 | Aspheric | 18.8211 | 0.5696 | 1.55 | 56.1 | 28.42 | −20.0000 |
| S8 | Aspheric | −87.4099 | 0.5335 | | | | 25.0000 |
| S9 | Aspheric | 36.1610 | 0.4737 | 1.55 | 56.1 | 342.15 | −20.0000 |
| S10 | Aspheric | 44.6359 | 0.2442 | | | | 25.0000 |
| S11 | Aspheric | 2.6392 | 0.5343 | 1.65 | 23.5 | 9.46 | −4.4584 |
| S12 | Aspheric | 4.2824 | 0.7195 | | | | −2.3310 |
| S13 | Aspheric | 3.5002 | 0.3113 | 1.55 | 56.1 | −5.82 | −0.3277 |
| S14 | Aspheric | 1.6133 | 0.2438 | | | | −5.8868 |
| S15 | Spherical | Infinite | 0.2100 | 1.52 | 64.2 | | |
| S16 | Spherical | Infinite | −0.7162 | | | | |
| S17 | Spherical | Infinite | | | | | |

TABLE 6

| Surface number | A4 | A6 | A8 | A10 | A12 |
|---|---|---|---|---|---|
| S1 | −5.7527E−02 | −2.1199E−02 | −7.0476E−03 | −1.6654E−03 | −2.9134E−04 |
| S2 | −1.6005E−01 | 8.0546E−03 | −1.9172E−03 | −1.3024E−03 | 2.5908E−04 |
| S3 | 1.5476E−02 | 2.2280E−02 | 1.8943E−03 | 6.5127E−05 | −1.1831E−04 |
| S4 | 3.3495E−02 | 7.0318E−03 | 8.6551E−04 | 2.6835E−03 | 6.3735E−04 |
| S5 | −1.9146E−01 | 3.6350E−03 | 6.8690E−03 | 4.9707E−03 | 9.2551E−04 |
| S6 | −1.2690E−01 | 7.0746E−03 | 7.9610E−03 | 4.1845E−03 | 8.8514E−04 |
| S7 | −1.9683E−01 | −1.8761E−02 | −2.0949E−04 | 2.1300E−03 | 1.0075E−03 |
| S8 | −3.7923E−01 | −4.6916E−02 | −7.1138E−03 | −1.4800E−03 | −7.8954E−04 |
| S9 | −4.7758E−01 | −9.3803E−02 | 1.8729E−02 | 1.9800E−02 | 3.4520E−03 |
| S10 | −8.3261E−01 | 1.2715E−01 | 2.9263E−02 | 1.7523E−02 | −1.1516E−02 |
| S11 | −1.6089E+00 | −2.5432E−02 | 8.4267E−02 | 2.0135E−02 | 3.5446E−03 |
| S12 | −1.9134E+00 | 1.0787E−01 | 1.0659E−01 | −4.8558E−02 | −3.3529E−04 |
| S13 | −4.3194E+00 | 1.3862E+00 | −5.4803E−01 | 1.7361E−01 | −4.0576E−02 |
| S14 | −3.0158E+00 | 7.5365E−01 | −2.8875E−01 | 1.3033E−01 | −2.3151E−02 |

| Surface number | A14 | A16 | A18 | A20 |
|---|---|---|---|---|
| S1 | 4.3898E−05 | 3.9064E−06 | 8.1632E−06 | −1.1107E−05 |
| S2 | −2.6784E−05 | −1.2364E−04 | 3.1878E−05 | −2.1910E−05 |
| S3 | −3.7245E−05 | −1.7412E−04 | 2.8586E−05 | −1.5569E−05 |
| S4 | 3.6114E−04 | −2.0882E−06 | −1.1537E−05 | −2.8023E−05 |
| S5 | 2.9363E−05 | −1.2151E−04 | −4.1621E−05 | 9.8695E−07 |
| S6 | 4.9156E−05 | −7.2957E−05 | −4.7000E−05 | −1.3629E−05 |
| S7 | 2.2897E−04 | −1.4391E−05 | −2.5263E−05 | −3.5948E−06 |
| S8 | −4.1439E−04 | −2.2518E−04 | −6.7553E−05 | −8.5829E−06 |
| S9 | −1.0976E−03 | −1.5567E−03 | −4.9980E−04 | −2.1132E−04 |
| S10 | −4.3464E−03 | −1.0523E−04 | 1.0765E−03 | 1.2213E−04 |
| S11 | −2.7815E−03 | −1.9952E−03 | −3.2533E−04 | −1.4446E−04 |
| S12 | −1.4983E−03 | 3.0664E−03 | −8.0065E−04 | −5.5956E−04 |
| S13 | 1.0557E−02 | −9.3925E−03 | 5.1888E−03 | −1.5338E−03 |
| S14 | 7.5932E−03 | −4.8905E−03 | 3.7376E−03 | −3.8539E−03 |

Figure 6A:
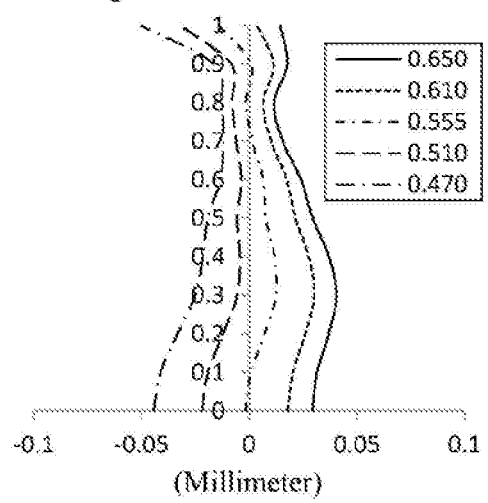
FIGS. 6A to 6D illustrate a longitudinal aberration curve, an astigmatic curve, a distortion curve, and a lateral color curve of the optical imaging system of the Example 3, respectively.
Figure 6B:
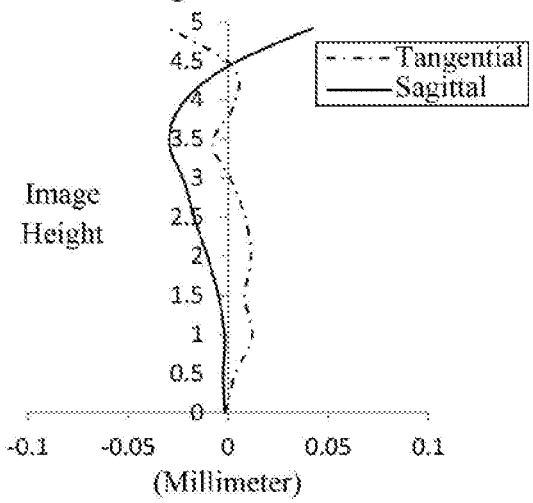
Figures 6C, 6D:
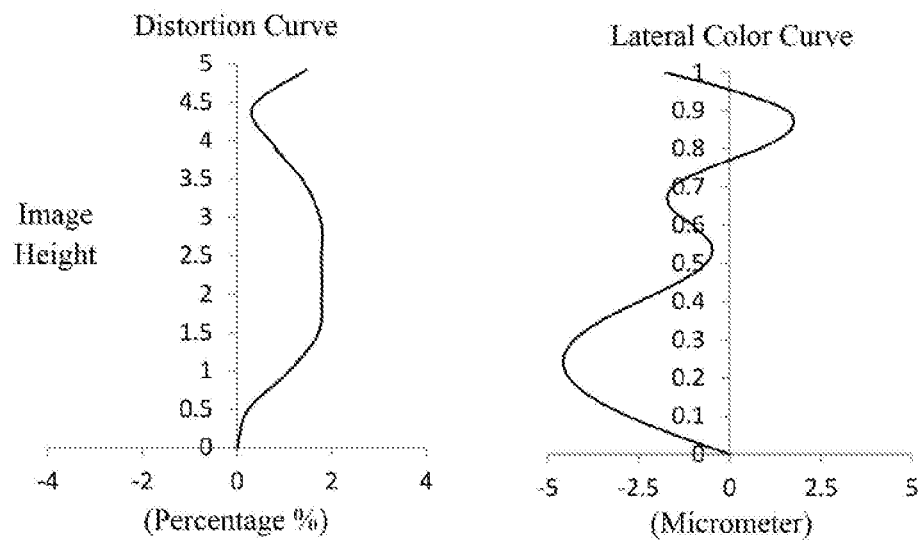

FIG. 6A illustrates a longitudinal aberration curve of the optical imaging system according to example 3, representing deviations of focal points converged by light of different wavelengths after passing through the optical imaging system. FIG. 6B illustrates an astigmatic curve of the optical imaging system according to example 3, representing a curvature of a tangential plane and a curvature of a sagittal plane. FIG. 6C illustrates a distortion curve of the optical imaging system according to example 3, representing amounts of distortion corresponding to different image heights. FIG. 6D illustrates a lateral color curve of the optical imaging system according to example 3, representing deviations of different image heights on an imaging plane after light passes through the optical imaging system. It can be seen from FIG. 6A to FIG. 6D that the optical imaging system provided in example 3 may achieve good image quality.

EXAMPLE 4

An optical imaging system according to example 4 of the present disclosure is described below with reference to FIG.

Figure 7:
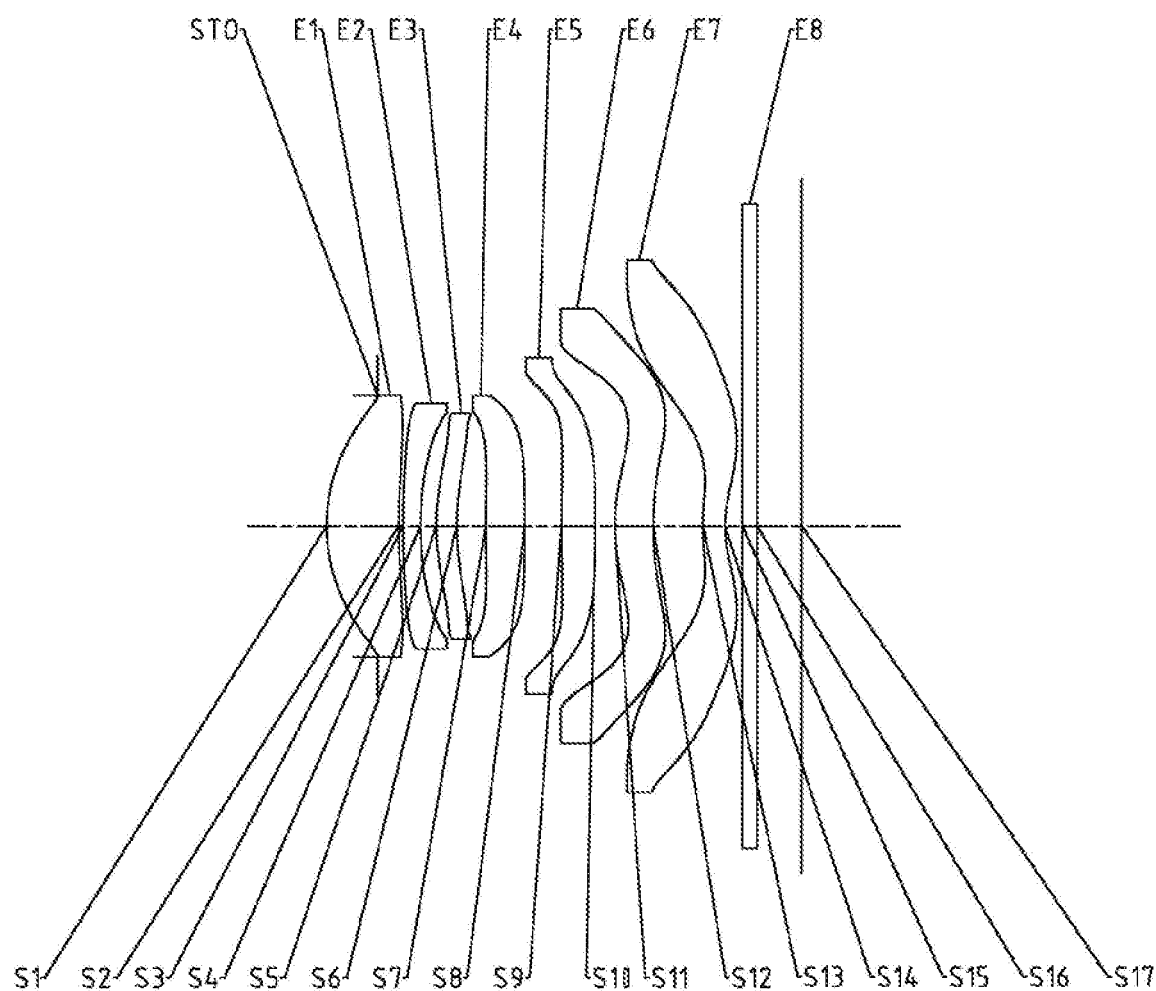
FIG. 7 illustrates a schematic structural view of an optical imaging system according to Example 4 of the present disclosure.
Figure 8A:
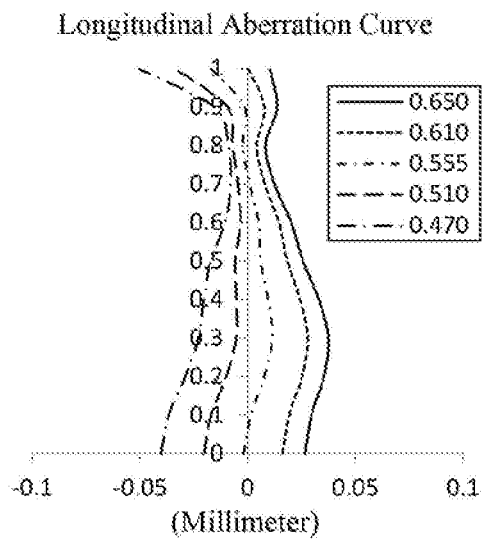
FIGS. 8A to 8D illustrate a longitudinal aberration curve, an astigmatic curve, a distortion curve, and a lateral color curve of the optical imaging system of the Example 4, respectively.
Figure 8B:
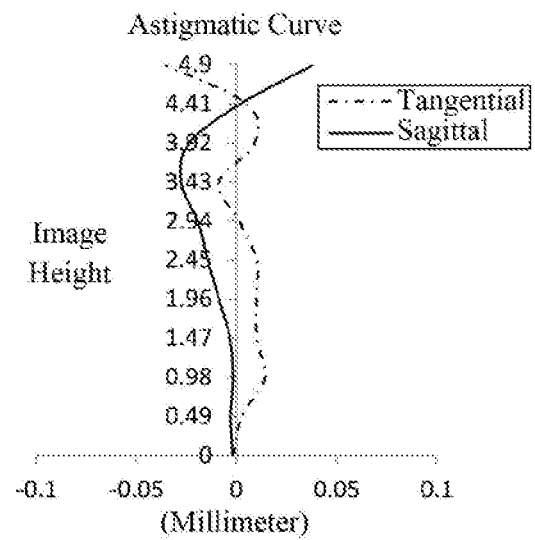
Figure 8C:
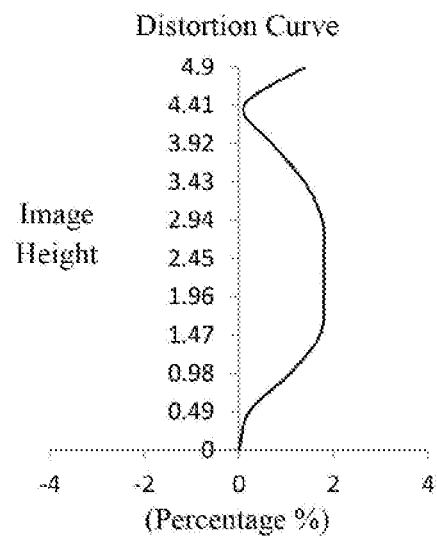
Figure 8D:
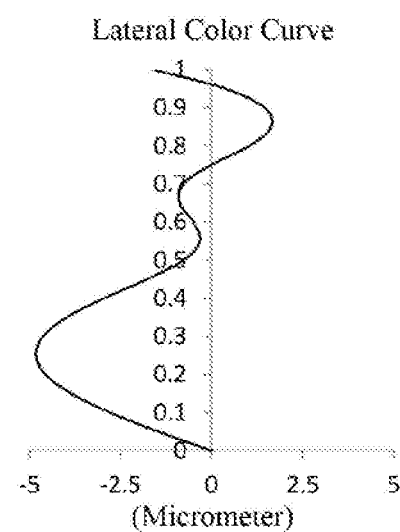

7 to FIG. 8D. FIG. 7 shows a schematic structural view of the optical imaging system according to example 4 of the present disclosure.

As shown in FIG. 7, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 4, an effective focal length f of the optical imaging system is 5.41 mm, an on-axis distance TTL from the object-side surface S1 of the first lens E1 to the imaging plane S17 is 6.70 mm, half of a diagonal length ImgH of an effective pixel area on the imaging plane S17 is 4.89 mm, and half of a maximal field-of-view Semi-FOV is 41.7°.

Table 7 is a table illustrating basic parameters of the optical imaging system of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (6) given in the above example 1.

TABLE 7

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.7165 | | | | |
| S1 | Aspheric | 2.4508 | 1.0162 | 1.55 | 55.9 | 6.06 | −0.0298 |
| S2 | Aspheric | 8.0342 | 0.0641 | | | | 0.0000 |
| S3 | Aspheric | 13.7884 | 0.2457 | 1.67 | 20.4 | −11.32 | 24.9896 |
| S4 | Aspheric | 4.8938 | 0.2204 | | | | 3.6616 |
| S5 | Aspheric | 3.1936 | 0.2900 | 1.65 | 23.5 | 25.14 | −1.6361 |
| S6 | Aspheric | 3.8359 | 0.4105 | | | | −2.8516 |
| S7 | Aspheric | 21.7272 | 0.5483 | 1.55 | 56.1 | 31.43 | −12.1211 |
| S8 | Aspheric | −80.8046 | 0.5157 | | | | −20.0000 |
| S9 | Aspheric | 25.6957 | 0.4738 | 1.55 | 56.1 | 107.46 | −20.0000 |
| S10 | Aspheric | 45.4268 | 0.2797 | | | | −20.0000 |
| S11 | Aspheric | 2.8263 | 0.5399 | 1.65 | 23.5 | 9.50 | −3.9060 |
| S12 | Aspheric | 4.8544 | 0.7015 | | | | −3.0518 |
| S13 | Aspheric | 3.4174 | 0.3110 | 1.55 | 56.1 | −5.59 | −0.3406 |
| S14 | Aspheric | 1.5603 | 0.2462 | | | | −5.7828 |
| S15 | Spherical | Infinite | 0.2100 | 1.52 | 64.2 | | |
| S16 | Spherical | Infinite | 0.6269 | | | | |
| S17 | Spherical | Infinite | | | | | |

TABLE 8

| Surface number | A4 | A6 | A8 | A10 | A12 |
|---|---|---|---|---|---|
| S1 | −5.6671E−02 | −2.1418E−02 | −7.1558E−03 | −1.6995E−03 | −2.8274E−04 |
| S2 | −1.5750E−01 | 6.4236E−03 | −1.0000E−03 | −1.8140E−03 | 4.6207E−04 |
| S3 | 1.9511E−02 | 2.0714E−02 | 2.7705E−03 | −6.3998E−04 | 4.2085E−05 |
| S4 | 3.7385E−02 | 8.3552E−03 | 1.4394E−03 | 2.2980E−03 | 5.8460E−04 |
| S5 | −1.9111E−01 | 6.1558E−03 | 7.9000E−03 | 5.0603E−03 | 9.4710E−04 |
| S6 | −1.3089E−01 | 6.6578E−03 | 8.4009E−03 | 4.2685E−03 | 9.6451E−04 |
| S7 | −2.0535E−01 | −2.0905E−02 | −5.6743E−04 | 1.8329E−03 | 8.5030E−04 |
| S8 | −3.7642E−01 | −4.6389E−02 | −6.4556E−03 | −1.4478E−03 | −7.7449E−04 |
| S9 | −5.0572E−01 | −8.5629E−02 | 1.8586E−02 | 1.9395E−02 | 3.5901E−03 |
| S10 | −8.3822E−01 | 1.2543E−01 | 4.0297E−02 | 1.8203E−02 | −1.0277E−02 |
| S11 | −1.6422E+00 | −2.2211E−02 | 1.0349E−01 | 2.3490E−02 | 3.9398E−03 |
| S12 | −1.7564E+00 | 7.1213E−02 | 1.1527E−01 | −4.6798E−02 | 9.4480E−04 |
| S13 | −4.3576E+00 | 1.3712E+00 | −5.5564E−01 | 1.8893E−01 | −5.1767E−02 |
| S14 | −3.0080E+00 | 7.5574E−01 | −2.9465E−01 | 1.3619E−01 | −2.6273E−02 |

TABLE 8-continued

| Surface number | A14 | A16 | A18 | A20 |
|---|---|---|---|---|
| S1 | 5.8681E−05 | 1.1868E−05 | 5.4739E−06 | −1.6894E−05 |
| S2 | −9.4253E−05 | −1.3977E−04 | 4.3740E−05 | −2.3699E−05 |
| S3 | −1.6498E−04 | −1.8526E−04 | 3.8481E−05 | −1.1475E−05 |
| S4 | 2.2704E−04 | −4.3473E−05 | −2.5575E−05 | −2.5589E−05 |
| S5 | −8.2122E−06 | −1.4524E−04 | −4.7891E−05 | 1.8977E−08 |
| S6 | 7.7483E−05 | −6.7689E−05 | −4.4932E−05 | −1.0175E−05 |
| S7 | 1.6595E−04 | −3.2825E−05 | −3.3240E−05 | −9.4609E−06 |
| S8 | −4.4525E−04 | −1.8493E−04 | −5.1015E−05 | 1.0496E−05 |
| S9 | −1.2839E−03 | −1.4679E−03 | −5.1963E−04 | −1.6187E−04 |
| S10 | −6.4245E−03 | −7.6884E−04 | 7.5490E−04 | 2.8228E−04 |
| S11 | −5.1172E−03 | −3.1292E−03 | −8.9319E−04 | −1.7363E−05 |
| S12 | −4.1117E−03 | 1.8897E−03 | −4.2329E−04 | −1.0228E−04 |
| S13 | 1.4625E−02 | −9.4844E−03 | 4.7964E−03 | −1.3322E−03 |
| S14 | 1.3313E−02 | −5.0314E−03 | 2.7829E−03 | 4.0548E−03 |

FIG. 8A illustrates a longitudinal aberration curve of the optical imaging system according to example 4, representing deviations of focal points converged by light of different wavelengths after passing through the optical imaging system. FIG. 8B illustrates an astigmatic curve of the optical imaging system according to example 4, representing a curvature of a tangential plane and a curvature of a sagittal plane. FIG. 8C illustrates a distortion curve of the optical imaging system according to example 4, representing amounts of distortion corresponding to different image heights. FIG. 8D illustrates a lateral color curve of the optical imaging system according to example 4, representing deviations of different image heights on an imaging plane after light passes through the optical imaging system. It can be seen from FIG. 8A to FIG. 8D that the optical imaging system provided in example 4 may achieve good image quality.

EXAMPLE 5

Figure 9:
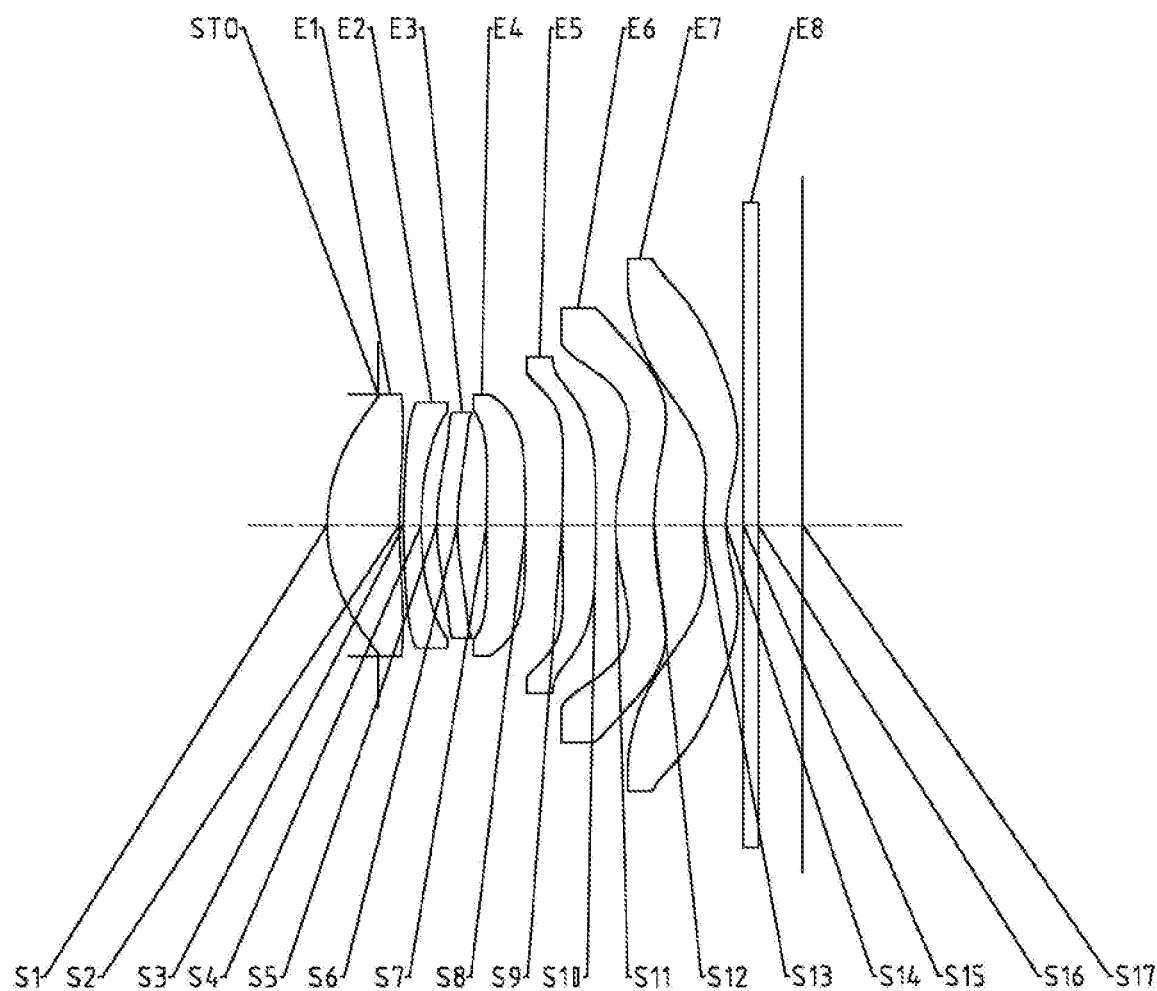
FIG. 9 illustrates a schematic structural view of an optical imaging system according to Example 5 of the present disclosure.

An optical imaging system according to example 5 of the present disclosure is described below with reference to FIG. 9 to FIG. 10D. FIG. 9 shows a schematic structural view of the optical imaging system according to example 5 of the present disclosure.

As shown in FIG. 9, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 5, an effective focal length f of the optical imaging system is 5.41 mm, an on-axis distance TTL from the object-side surface S1 of the first lens E1 to the imaging plane S17 is 6.70 mm, half of a diagonal length ImgH of an effective pixel area on the imaging plane S17 is 4.89 mm, and half of a maximal field-of-view Semi-FOV is 41.7°.

Table 9 is a table illustrating basic parameters of the optical imaging system of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (6) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7165 | | | | |
| S1 | Aspheric | 2.4510 | 1.0164 | 1.55 | 55.9 | 6.05 | −0.0296 |
| S2 | Aspheric | 8.0660 | 0.0642 | | | | 0.0000 |
| S3 | Aspheric | 13.8198 | 0.2457 | 1.67 | 20.4 | −11.28 | 25.0000 |
| S4 | Aspheric | 4.8871 | 0.2203 | | | | 3.6786 |
| S5 | Aspheric | 3.1986 | 0.2900 | 1.65 | 23.5 | 25.10 | −1.6029 |
| S6 | Aspheric | 3.8450 | 0.4108 | | | | −2.8218 |
| S7 | Aspheric | 21.4793 | 0.5487 | 1.55 | 56.1 | 31.47 | −13.8419 |

TABLE 9-continued

| Surface number | Surface type | Radius of curvature | Thickness/ Distance | Material Refractive index | Abbe number | Focal length | Conic coefficient |
|---|---|---|---|---|---|---|---|
| S8  | Aspheric  | −84.9557 | 0.5148 |      |      |        | 25.0000 |
| S9  | Aspheric  | 25.0692  | 0.4734 | 1.55 | 56.1 | 102.03 | −20.0000 |
| S10 | Aspheric  | 45.2860  | 0.2802 |      |      |        | 2.9546 |
| S11 | Aspheric  | 2.8504   | 0.5407 | 1.65 | 23.5 | 9.52   | −3.8890 |
| S12 | Aspheric  | 4.9279   | 0.7013 |      |      |        | −2.9871 |
| S13 | Aspheric  | 3.4086   | 0.3110 | 1.55 | 56.1 | −5.56  | −0.3399 |
| S14 | Aspheric  | 1.5544   | 0.2459 |      |      |        | −5.7732 |
| S15 | Spherical | Infinite | 0.2100 | 1.52 | 64.2 |        |  |
| S16 | Spherical | Infinite | 0.6266 |      |      |        |  |
| S17 | Spherical | Infinite |        |      |      |        |  |

TABLE 10

| Surface number | A4 | A6 | A8 | A10 | A12 |
|---|---|---|---|---|---|
| S1  | −5.6848E−02 | −2.1579E−02 | −7.2266E−03 | −1.7094E−03 | −2.8786E−04 |
| S2  | −1.5764E−01 |  6.1032E−03 | −9.4502E−04 | −1.9166E−03 |  4.8252E−04 |
| S3  |  1.9683E−02 |  2.0453E−02 |  2.8703E−03 | −7.3767E−04 |  7.5868E−05 |
| S4  |  3.7887E−02 |  8.5345E−03 |  1.5343E−03 |  2.2724E−03 |  5.9993E−04 |
| S5  | −1.8953E−01 |  5.7061E−03 |  7.6268E−03 |  4.9647E−03 |  9.5601E−04 |
| S6  | −1.3032E−01 |  6.2595E−03 |  8.1821E−03 |  4.2333E−03 |  9.7833E−04 |
| S7  | −2.0833E−01 | −2.1262E−02 | −5.8558E−04 |  1.9510E−03 |  9.2073E−04 |
| S8  | −3.8058E−01 | −4.6847E−02 | −6.6418E−03 | −1.4302E−03 | −7.5991E−04 |
| S9  | −5.0926E−01 | −8.5295E−02 |  1.8959E−02 |  1.9402E−02 |  3.5489E−03 |
| S10 | −8.3750E−01 |  1.2500E−01 |  4.0366E−02 |  1.7498E−02 | −1.0215E−02 |
| S11 | −1.6526E+00 | −1.9711E−02 |  1.0622E−01 |  2.3036E−02 |  3.2379E−03 |
| S12 | −1.7507E+00 |  7.1113E−02 |  1.1479E−01 | −4.6889E−02 |  1.1306E−03 |
| S13 | −4.3835E+00 |  1.3786E+00 | −5.6128E−01 |  1.9301E−01 | −5.4128E−02 |
| S14 | −3.0113E+00 |  7.5741E−01 | −2.9520E−01 |  1.3738E−01 | −2.7384E−02 |

| Surface number | A14 | A16 | A18 | A20 |
|---|---|---|---|---|
| S1  |  5.7438E−05 |  9.8564E−06 |  5.3918E−06 | −1.7070E−05 |
| S2  | −1.0698E−04 | −1.4305E−04 |  4.2618E−05 | −2.4548E−05 |
| S3  | −1.6607E−04 | −1.8225E−04 |  3.8831E−05 | −1.0338E−05 |
| S4  |  2.2479E−04 | −4.4464E−05 | −2.7356E−05 | −2.6397E−05 |
| S5  |  6.5192E−06 | −1.3959E−04 | −4.8407E−05 | −2.8094E−07 |
| S6  |  9.2325E−05 | −6.3113E−05 | −4.4759E−05 | −1.1220E−05 |
| S7  |  1.9762E−04 | −2.7225E−05 | −3.3491E−05 | −1.0529E−05 |
| S8  | −4.3681E−04 | −1.9148E−04 | −5.5872E−05 |  5.6224E−06 |
| S9  | −1.3539E−03 | −1.5144E−03 | −5.4871E−04 | −1.6749E−04 |
| S10 | −6.3766E−03 | −7.5073E−04 |  7.2066E−04 |  2.8771E−04 |
| S11 | −5.3323E−03 | −3.2778E−03 | −1.0707E−03 | −6.5704E−05 |
| S12 | −3.7608E−03 |  1.6646E−03 | −5.0580E−04 | −6.8962E−05 |
| S13 |  1.5560E−02 | −9.7443E−03 |  4.8377E−03 | −1.3208E−03 |
| S14 |  1.3872E−02 | −4.9868E−03 |  2.9111E−03 |  4.0314E−03 |

Figure 10A:
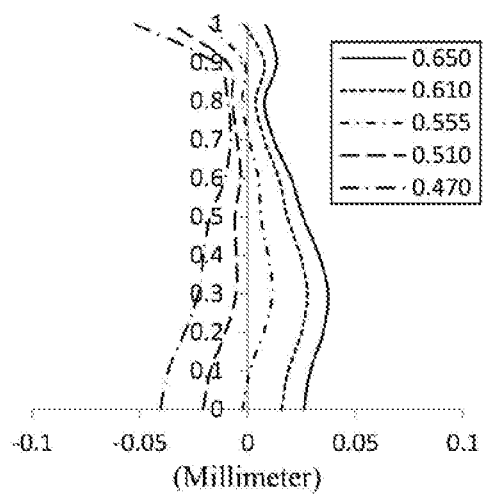
FIGS. 10A to 10D illustrate a longitudinal aberration curve, an astigmatic curve, a distortion curve, and a lateral color curve of the optical imaging system of the Example 5, respectively.
Figure 10B:
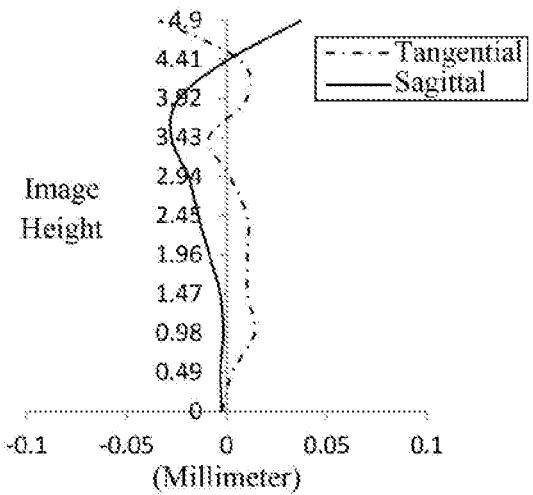
Figures 10C, 10D:
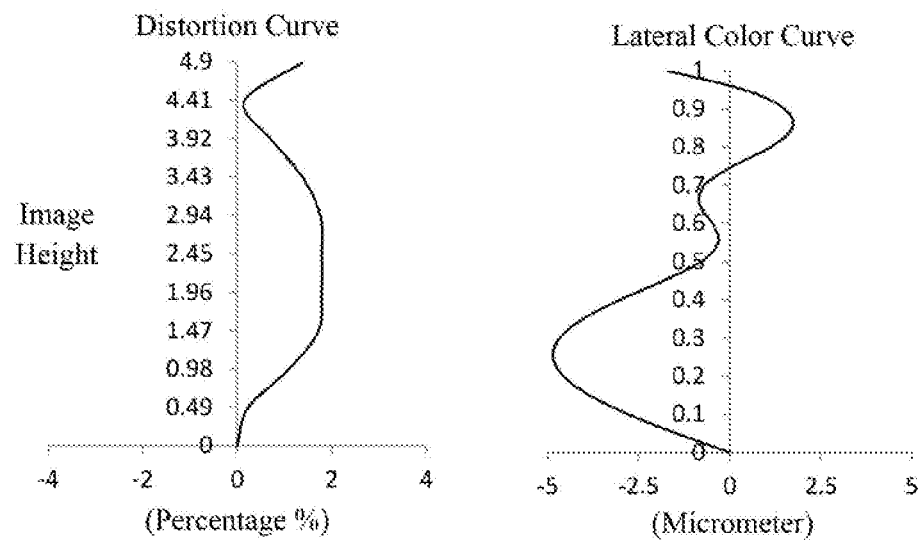

FIG. 10A illustrates a longitudinal aberration curve of the optical imaging system according to example 5, representing deviations of focal points converged by light of different wavelengths after passing through the optical imaging system. FIG. 10B illustrates an astigmatic curve of the optical imaging system according to example 5, representing a curvature of a tangential plane and a curvature of a sagittal plane. FIG. 10C illustrates a distortion curve of the optical imaging system according to example 5, representing amounts of distortion corresponding to different image heights. FIG. 10D illustrates a lateral color curve of the optical imaging system according to example 5, representing deviations of different image heights on an imaging plane after light passes through the optical imaging system. It can be seen from FIG. 10A to FIG. 10D that the optical imaging system provided in example 5 may achieve good image quality.

EXAMPLE 6

Figure 11:
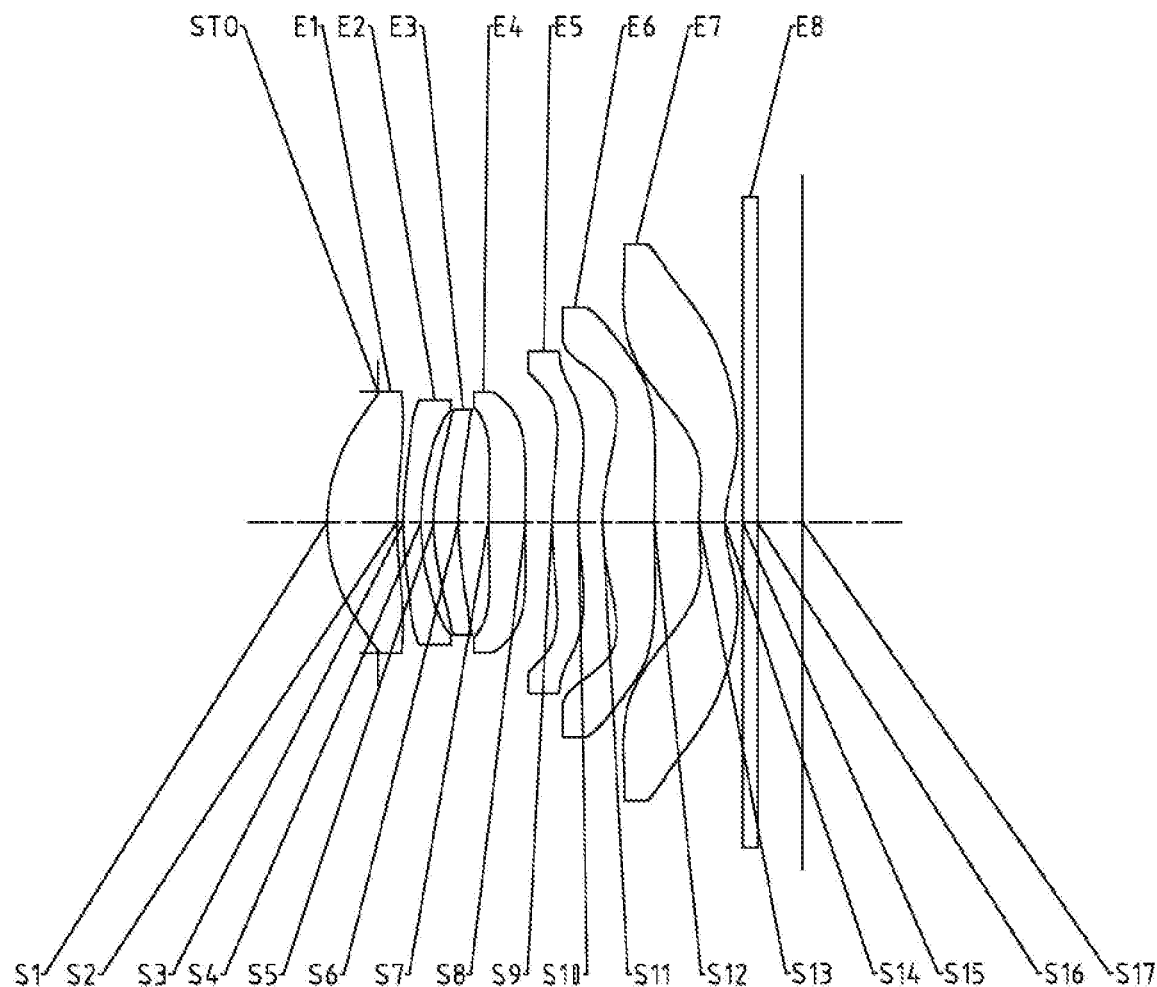
FIG. 11 illustrates a schematic structural view of an optical imaging system according to Example 6 of the present disclosure.

An optical imaging system according to example 6 of the present disclosure is described below with reference to FIG. 11 to FIG. 12D. FIG. 11 shows a schematic structural view of the optical imaging system according to example 6 of the present disclosure.

As shown in FIG. 11, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 6, an effective focal length f of the optical imaging system is 5.41 mm, an on-axis distance TTL from the object-side surface S1 of the first lens E1 to the imaging plane S17 is 6.70 mm, half of a diagonal length ImgH of an effective pixel area on the imaging plane S17 is 4.89 mm, and half of a maximal field-of-view Semi-FOV is 41.8°.

Table 11 is a table illustrating basic parameters of the optical imaging system of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (6) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7151 | | | | |
| S1 | Aspheric | 2.4607 | 0.9843 | 1.55 | 55.9 | 6.74 | −0.0154 |
| S2 | Aspheric | 6.3747 | 0.0932 | | | | 0.0000 |
| S3 | Aspheric | 5.6276 | 0.2470 | 1.67 | 20.4 | −12.56 | −6.9269 |
| S4 | Aspheric | 3.3280 | 0.1786 | | | | 0.8786 |
| S5 | Aspheric | 3.1389 | 0.3473 | 1.65 | 23.5 | 18.61 | −0.4662 |
| S6 | Aspheric | 4.3930 | 0.4255 | | | | −0.9528 |
| S7 | Aspheric | 13.4766 | 0.5183 | 1.55 | 56.1 | 81.57 | −15.1143 |
| S8 | Aspheric | 19.0634 | 0.3731 | | | | −19.3359 |
| S9 | Aspheric | 4.1929 | 0.3761 | 1.55 | 56.1 | −31.43 | −17.6825 |
| S10 | Aspheric | 3.2842 | 0.3369 | | | | −10.5417 |
| S11 | Aspheric | 2.9143 | 0.7306 | 1.65 | 23.5 | 5.56 | −2.8172 |
| S12 | Aspheric | 66.7667 | 0.6337 | | | | −4.2106 |
| S13 | Aspheric | 3.2763 | 0.3600 | 1.55 | 56.1 | −4.95 | −0.2975 |
| S14 | Aspheric | 1.4110 | 0.2523 | | | | −5.7111 |
| S15 | Spherical | Infinite | 0.2100 | 1.52 | 64.2 | | |
| S16 | Spherical | Infinite | 0.6330 | | | | |
| S17 | Spherical | Infinite | | | | | |

TABLE 12

| Surface number | A4 | A6 | A8 | A10 | A12 |
|---|---|---|---|---|---|
| S1 | −5.3049E−02 | −2.2610E−02 | −7.8045E−03 | −1.9506E−03 | 4.0542E−04 |
| S2 | −1.6686E−01 | −6.3865E−03 | 3.3868E−03 | −3.0982E−03 | 6.4146E−04 |
| S3 | −5.1663E−02 | 2.3908E−02 | 7.2211E−03 | −3.0749E−03 | 6.2759E−04 |
| S4 | −4.4171E−02 | 1.8782E−02 | 4.0721E−03 | 6.2465E−04 | 6.1041E−04 |
| S5 | −1.5227E−01 | 3.8201E−03 | 6.3881E−03 | 5.7038E−03 | 1.6051E−03 |
| S6 | −1.0788E−01 | 1.0438E−03 | 4.1752E−03 | 4.2562E−03 | 1.5095E−03 |
| S7 | −2.4809E−01 | −2.8755E−02 | −5.4965E−03 | 2.4524E−04 | 7.5735E−04 |
| S8 | −4.3261E−01 | −4.0543E−02 | −6.9983E−03 | 5.7887E−04 | 6.2958E−05 |
| S9 | −6.1037E−01 | −4.3203E−02 | −7.7416E−03 | 1.7330E−02 | −3.2407E−04 |
| S10 | −9.5584E−01 | 1.7673E−01 | 1.0222E−02 | 1.6651E−02 | −1.4448E−02 |
| S11 | −1.6173E+00 | 9.2030E−03 | 1.2287E−01 | 4.6061E−02 | −1.8916E−02 |
| S12 | −1.1299E+00 | 1.3116E−02 | 4.7331E−02 | −3.8364E−02 | −1.3341E−02 |
| S13 | −5.0716E+00 | 1.5932E+00 | −8.0631E−01 | 2.9419E−01 | −1.0813E−01 |
| S14 | −3.1992E+00 | 8.4867E−01 | −2.7777E−01 | 1.4289E−01 | −7.6817E−02 |

| Surface number | A14 | A16 | A18 | A20 |
|---|---|---|---|---|
| S1 | 3.7543E−05 | −5.0680E−06 | 9.2498E−06 | −1.9315E−05 |
| S2 | −7.5783E−05 | −6.9350E−05 | 8.1117E−06 | 5.1624E−06 |
| S3 | −1.6626E−04 | −1.2618E−04 | 4.3959E−05 | 2.1597E−05 |
| S4 | 8.7866E−05 | −1.0502E−04 | −3.5192E−05 | −1.5162E−05 |
| S5 | 2.6291E−04 | −1.5524E−04 | −9.7590E−05 | −3.2665E−05 |
| S6 | 4.4489E−04 | 7.3169E−05 | 3.9389E−06 | 1.7044E−08 |

TABLE 12-continued

| | | | | |
|---|---|---|---|---|
| S7 | 5.0984E−04 | 1.5493E−04 | 4.7433E−05 | −1.1080E−05 |
| S8 | 3.8504E−04 | 1.2549E−04 | 7.4667E−05 | 4.8845E−05 |
| S9 | 4.5818E−04 | −3.8976E−04 | −5.5907E−05 | −8.9713E−05 |
| S10 | −1.5924E−03 | 6.7739E−04 | 5.6635E−04 | −5.3836E−06 |
| S11 | −1.9550E−02 | −2.9738E−03 | 1.1616E−03 | 6.6621E−04 |
| S12 | 6.0803E−03 | 6.4278E−03 | −3.9695E−03 | −2.2383E−03 |
| S13 | 2.7959E−02 | −9.9937E−03 | 3.6832E−03 | −8.2840E−04 |
| S14 | 1.6584E−02 | −8.7989E−03 | 4.2534E−03 | 6.6063E−04 |

Figure 12A:
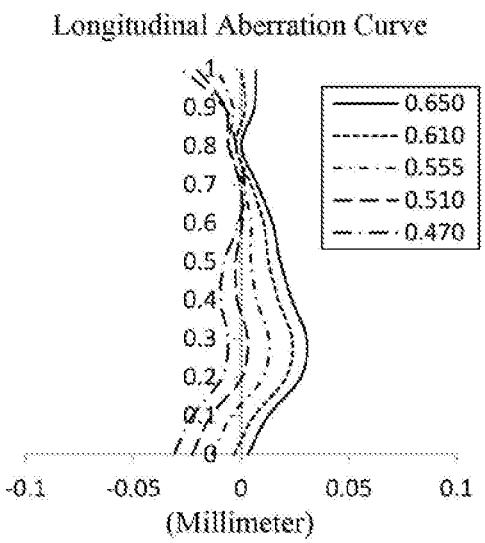
FIGS. 12A to 12D illustrate a longitudinal aberration curve, an astigmatic curve, a distortion curve, and a lateral color curve of the optical imaging system of the Example 6, respectively.
Figure 12B:
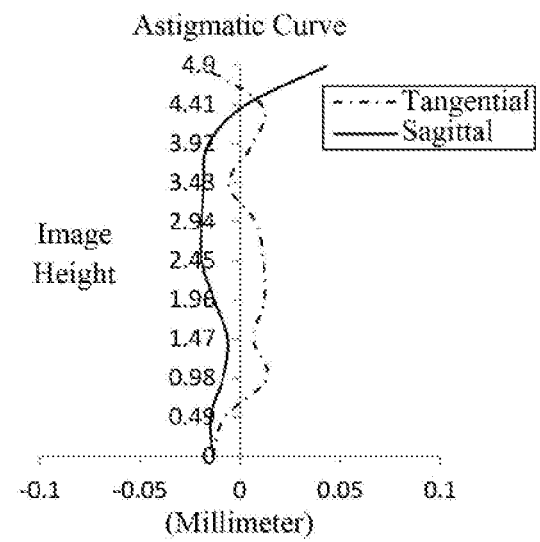
Figure 12C:
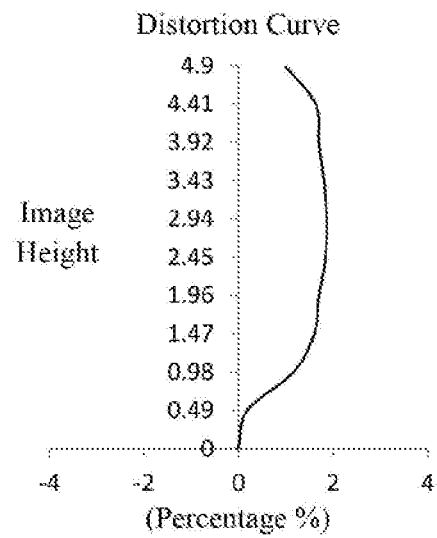
Figure 12D:
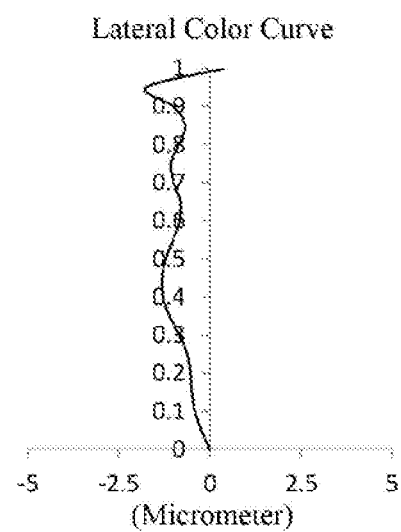

FIG. 12A illustrates a longitudinal aberration curve of the optical imaging system according to example 6, representing deviations of focal points converged by light of different wavelengths after passing through the optical imaging system. FIG. 12B illustrates an astigmatic curve of the optical imaging system according to example 6, representing a curvature of a tangential plane and a curvature of a sagittal plane. FIG. 12C illustrates a distortion curve of the optical imaging system according to example 6, representing amounts of distortion corresponding to different image heights. FIG. 12D illustrates a lateral color curve of the optical imaging system according to example 6, representing deviations of different image heights on an imaging plane after light passes through the optical imaging system. It can be seen from FIG. 12A to FIG. 12D that the optical imaging system provided in example 6 may achieve good image quality.

EXAMPLE 7

Figure 13:
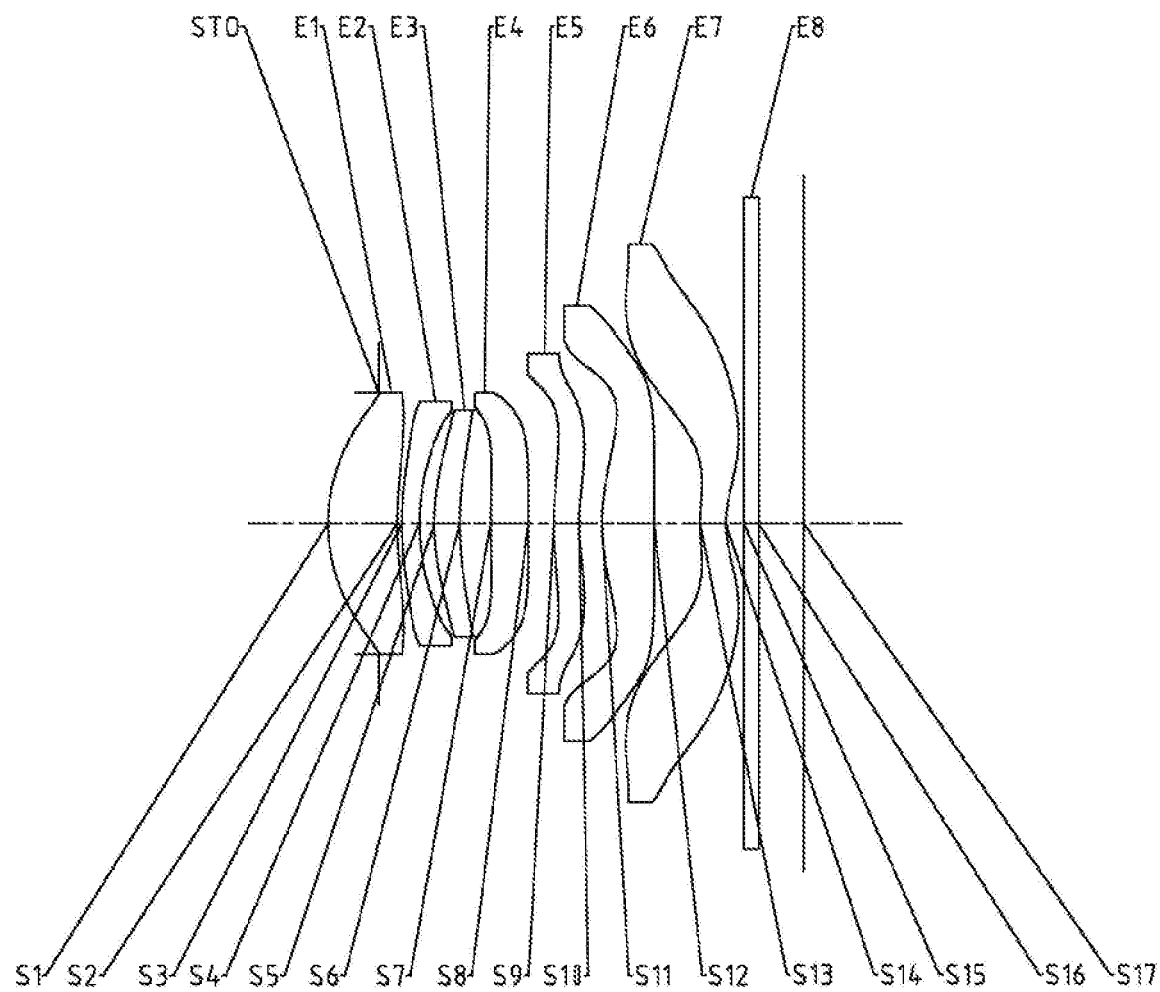
FIG. 13 illustrates a schematic structural view of an optical imaging system according to Example 7 of the present disclosure.

An optical imaging system according to example 7 of the present disclosure is described below with reference to FIG. 13 to FIG. 14D. FIG. 13 shows a schematic structural view of the optical imaging system according to example 7 of the present disclosure.

As shown in FIG. 13, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 7, an effective focal length f of the optical imaging system is 5.41 mm, an on-axis distance TTL from the object-side surface S1 of the first lens E1 to the imaging plane S17 is 6.70 mm, half of a diagonal length ImgH of an effective pixel area on the imaging plane S17 is 4.89 mm, and half of a maximal field-of-view Semi-FOV is 41.8°.

Table 13 is a table illustrating basic parameters of the optical imaging system of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (6) given in the above example 1.

TABLE 13

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.7125 | | | | |
| S1 | Aspheric | 2.4834 | 0.9758 | 1.55 | 55.9 | 6.90 | 0.1068 |
| S2 | Aspheric | 6.2816 | 0.0640 | | | | 0.0000 |
| S3 | Aspheric | 4.4236 | 0.2470 | 1.67 | 19.2 | −14.03 | −7.8881 |
| S4 | Aspheric | 2.9510 | 0.2100 | | | | 0.7585 |
| S5 | Aspheric | 3.3658 | 0.3570 | 1.56 | 53.7 | 19.13 | 0.2339 |
| S6 | Aspheric | 4.8134 | 0.4370 | | | | 0.6805 |
| S7 | Aspheric | 18.1922 | 0.5293 | 1.55 | 55.9 | 77.28 | 25.0000 |
| S8 | Aspheric | 31.6578 | 0.3598 | | | | 24.6807 |
| S9 | Aspheric | 4.1666 | 0.3568 | 1.35 | 57.4 | −21.50 | −16.9934 |
| S10 | Aspheric | 3.0209 | 0.3206 | | | | −10.8173 |
| S11 | Aspheric | 2.8583 | 0.7350 | 1.46 | 55.0 | 5.21 | −2.7767 |
| S12 | Aspheric | 452.1690 | 0.6515 | | | | −20.0000 |
| S13 | Aspheric | 3.3413 | 0.3600 | 1.54 | 55.9 | −4.93 | −0.2716 |
| S14 | Aspheric | 1.4217 | 0.2527 | | | | −5.9108 |
| S15 | Spherical | Infinite | 0.2100 | 1.52 | 64.2 | | |

TABLE 13-continued

| | | | | Material | | | |
|---|---|---|---|---|---|---|---|
| Surface number | Surface type | Radius of curvature | Thickness/ Distance | Refractive index | Abbe number | Focal length | Conic coefficient |
| S16 | Spherical | Infinite | 0.6334 | | | | |
| S17 | Spherical | Infinite | | | | | |

TABLE 14

| Surface number | A4 | A6 | A8 | A10 | A12 |
|---|---|---|---|---|---|
| S1 | −6.8906E−02 | −2.4090E−02 | −7.7779E−03 | −1.8503E−03 | −3.8633E−04 |
| S2 | −1.8696E−01 | −2.6201E−03 | 7.0899E−04 | −2.7382E−03 | 5.3303E−04 |
| S3 | −6.0813E−02 | 2.6279E−02 | 5.2077E−03 | −2.1356E−03 | 3.7863E−04 |
| S4 | −8.0515E−02 | 2.2729E−02 | 4.1703E−03 | 1.0050E−03 | 3.2649E−04 |
| S5 | −1.2661E−01 | 9.1111E−04 | 5.2251E−03 | 4.3746E−03 | 1.3912E−03 |
| S6 | −9.3081E−02 | −2.2073E−03 | 3.4076E−03 | 3.2904E−03 | 1.3247E−03 |
| S7 | −2.3385E−01 | −3.1523E−02 | −5.1543E−03 | 1.8441E−04 | 7.7620E−04 |
| S8 | −3.9493E−01 | −4.1681E−02 | −6.8238E−03 | 9.9001E−04 | −1.0785E−04 |
| S9 | −6.2009E−01 | −3.6891E−02 | −1.5572E−02 | 2.0435E−02 | 4.2871E−05 |
| S10 | −1.0082E+00 | 1.9692E−01 | 1.0478E−02 | 2.1576E−02 | −1.9629E−02 |
| S11 | −1.5823E+00 | 5.2363E−03 | 1.1623E−01 | 5.2531E−02 | −1.9322E−02 |
| S12 | −9.7926E−01 | −2.4268E−02 | 6.3321E−02 | −3.4950E−02 | −2.1290E−02 |
| S13 | −5.1160E+00 | 1.5849E+00 | −8.2335E−01 | 2.9895E−01 | −1.2166E−01 |
| S14 | −3.2605E+00 | 9.0156E−01 | −2.7589E−01 | 1.3732E−01 | −8.4273E−02 |

| Surface number | A14 | A16 | A18 | A20 |
|---|---|---|---|---|
| S1 | 3.2501E−05 | −5.8882E−06 | 7.4126E−06 | −2.1909E−05 |
| S2 | −2.2480E−04 | −5.4511E−05 | −5.0085E−06 | 4.2556E−07 |
| S3 | −1.9393E−04 | −7.8891E−05 | 2.3146E−05 | 1.8144E−05 |
| S4 | −1.4870E−04 | −1.9659E−04 | −7.8840E−05 | −2.4596E−05 |
| S5 | 2.3785E−04 | −8.0302E−05 | −6.7480E−05 | −2.5405E−05 |
| S6 | 3.9826E−04 | 7.4525E−05 | 1.3931E−05 | 2.2649E−06 |
| S7 | 5.3012E−04 | 1.6459E−04 | 4.8793E−05 | −1.8122E−05 |
| S8 | 3.8768E−04 | 3.7489E−05 | 6.0380E−05 | 2.4173E−05 |
| S9 | 9.1222E−04 | −7.4264E−04 | −8.6582E−05 | −9.0044E−05 |
| S10 | −2.0906E−03 | 5.5697E−04 | 1.2634E−03 | 1.8078E−04 |
| S11 | −1.7927E−02 | −1.2187E−03 | 2.2699E−03 | 1.1994E−03 |
| S12 | 6.0323E−03 | 7.0149E−03 | −3.7337E−03 | −1.2560E−03 |
| S13 | 3.1826E−02 | −1.2019E−02 | 3.1013E−03 | −7.0463E−04 |
| S14 | 1.3782E−02 | −1.0573E−02 | 5.6484E−03 | 9.5047E−04 |

Figure 14A:
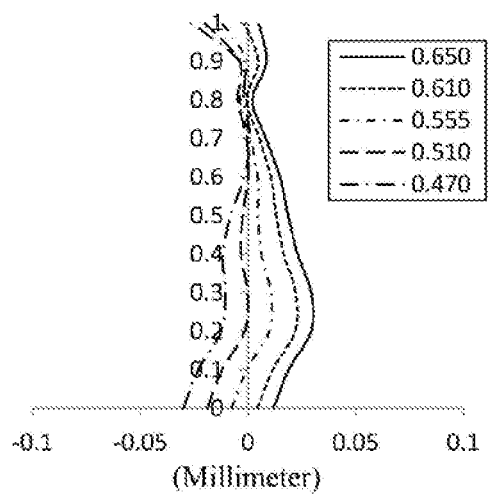
FIGS. 14A to 14D illustrate a longitudinal aberration curve, an astigmatic curve, a distortion curve, and a lateral color curve of the optical imaging system of the Example 7, respectively.
Figure 14B:
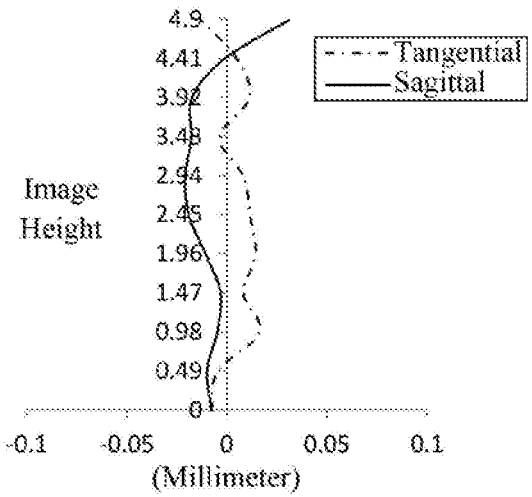
Figure 14C:
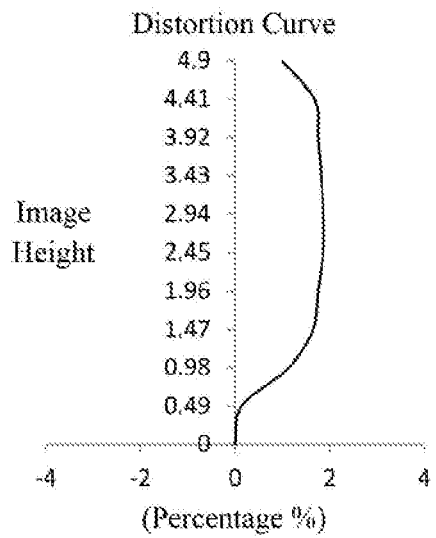
Figure 14D:
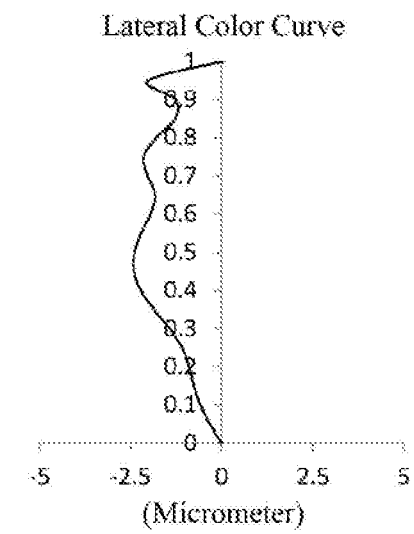

FIG. 14A illustrates a longitudinal aberration curve of the optical imaging system according to example 7, representing deviations of focal points converged by light of different wavelengths after passing through the optical imaging system. FIG. 14B illustrates an astigmatic curve of the optical imaging system according to example 7, representing a curvature of a tangential plane and a curvature of a sagittal plane. FIG. 14C illustrates a distortion curve of the optical imaging system according to example 7, representing amounts of distortion corresponding to different image heights. FIG. 14D illustrates a lateral color curve of the optical imaging system according to example 7, representing deviations of different image heights on an imaging plane after light passes through the optical imaging system. It can be seen from FIG. 14A to FIG. 14D that the optical imaging system provided in example 7 may achieve good image quality.

EXAMPLE 8

Figure 15:
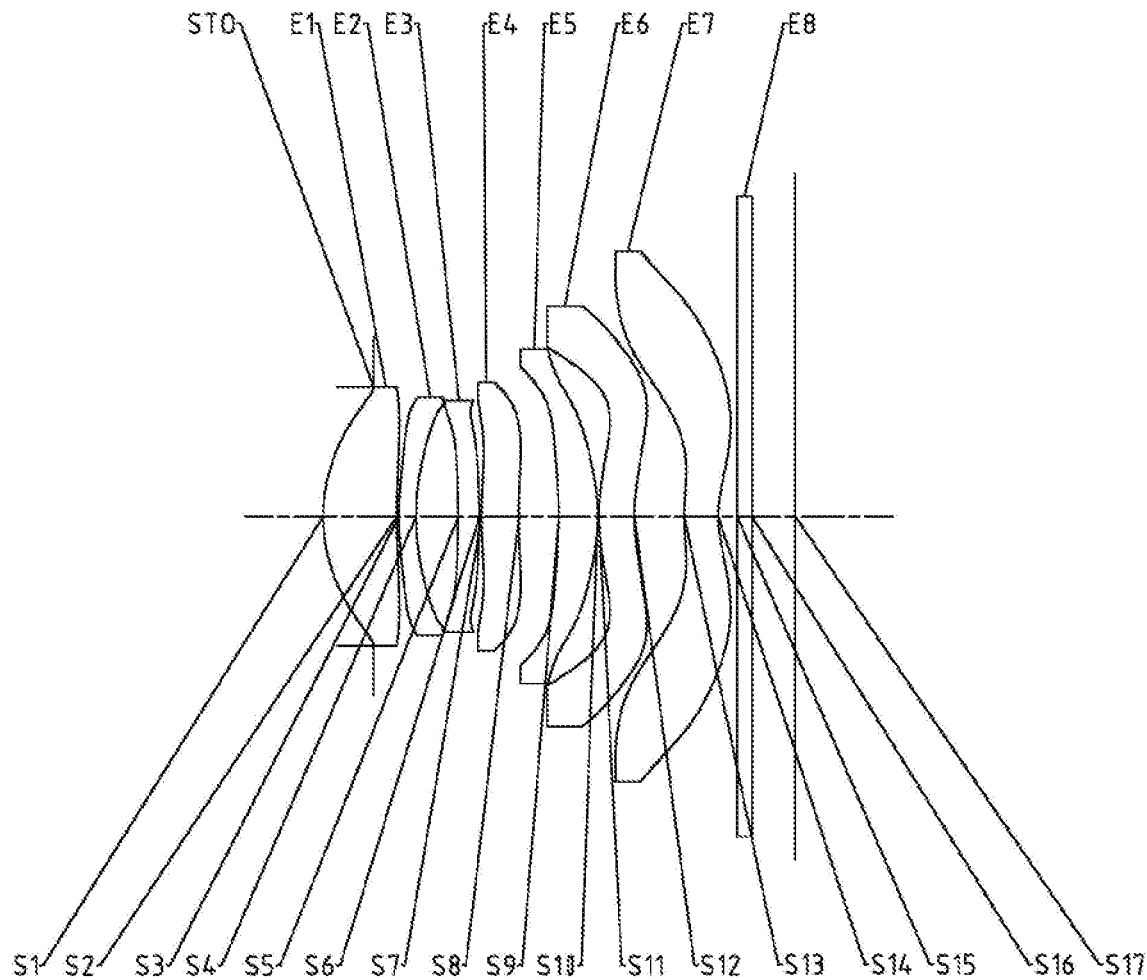
FIG. 15 illustrates a schematic structural view of an optical imaging system according to Example 8 of the present disclosure.

An optical imaging system according to example 8 of the present disclosure is described below with reference to FIG. 15 to FIG. 16D. FIG. 15 shows a schematic structural view of the optical imaging system according to example 8 of the present disclosure.

As shown in FIG. 15, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 8, an effective focal length f of the optical imaging system is 5.41 mm, an on-axis distance TTL from the object-side surface S1 of the first lens E1 to the imaging plane S17 is 6.70 mm, half of a diagonal length ImgH of an effective pixel area on the imaging plane S17 is 4.86 mm, and half of a maximal field-of-view Semi-FOV is 41.7°.

Table 15 is a table illustrating basic parameters of the optical imaging system of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (6) given in the above example 1.

TABLE 15

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7129 | | | | |
| S1 | Aspheric | 2.4374 | 1.0439 | 1.55 | 55.9 | 5.81 | −0.0248 |
| S2 | Aspheric | 8.9402 | 0.0300 | | | | 0.0000 |
| S3 | Aspheric | 4.9077 | 0.2457 | 1.67 | 19.2 | −23.15 | −11.7184 |
| S4 | Aspheric | 3.6627 | 0.5982 | | | | 0.2536 |
| S5 | Aspheric | −9.7039 | 0.3000 | 1.65 | 23.5 | 135.74 | 25.0000 |
| S6 | Aspheric | −8.8409 | 0.0300 | | | | 25.0000 |
| S7 | Aspheric | 7.1378 | 0.5301 | 1.55 | 55.9 | 75.36 | −17.4001 |
| S8 | Aspheric | 8.4096 | 0.5666 | | | | −16.7554 |
| S9 | Aspheric | −5.0451 | 0.5519 | 1.55 | 55.9 | 11.74 | −18.7033 |
| S10 | Aspheric | −2.9325 | 0.0201 | | | | −13.5378 |
| S11 | Aspheric | 3.0442 | 0.5000 | 1.65 | 23.5 | −242.91 | −6.0489 |
| S12 | Aspheric | 2.7940 | 0.7091 | | | | −16.1354 |
| S13 | Aspheric | 3.1888 | 0.4800 | 1.54 | 55.9 | −6.73 | −0.4276 |
| S14 | Aspheric | 1.6044 | 0.2704 | | | | −5.6529 |
| S15 | Spherical | Infinite | 0.2100 | 1.52 | 64.2 | | |
| S16 | Spherical | Infinite | 0.6142 | | | | |
| S17 | Spherical | Infinite | | | | | |

TABLE 16

| Surface number | A4 | A6 | A8 | A10 | A12 |
|---|---|---|---|---|---|
| S1 | −5.2361E−02 | −2.6595E−02 | −1.0203E−02 | −2.4519E−03 | −3.5253E−04 |
| S2 | −1.6677E−01 | 1.1714E−01 | −6.3541E−03 | 8.7587E−04 | 4.8085E−05 |
| S3 | −3.4741E−02 | 4.1652E−02 | 5.2400E−03 | 1.7886E−03 | 7.7262E−04 |
| S4 | −1.7644E−02 | 1.2360E−02 | 5.4088E−03 | 1.5963E−03 | 1.0609E−03 |
| S5 | −1.5890E−02 | −2.1942E−02 | 9.7877E−03 | 1.2924E−03 | 1.2804E−04 |
| S6 | 6.8690E−02 | 2.7182E−02 | 2.4018E−02 | 1.2403E−03 | 2.4436E−05 |
| S7 | −2.6574E−01 | 3.2623E−02 | 8.0860E−03 | −1.6549E−03 | 6.5834E−04 |
| S8 | −4.7768E−01 | −3.4818E−02 | −2.2214E−03 | −3.4631E−05 | 1.1714E−03 |
| S9 | −1.2539E−01 | −1.3233E−01 | 2.6816E−02 | 2.8936E−03 | −5.4330E−04 |
| S10 | −3.0997E−01 | 6.2570E−02 | 3.3176E−02 | −8.1221E−03 | −1.0923E−02 |
| S11 | −1.3549E+00 | −6.7864E−02 | 4.7825E−02 | 1.4471E−02 | −6.3721E−03 |
| S12 | −1.3193E+00 | 3.3749E−02 | 5.8754E−02 | −2.4698E−02 | −1.3262E−02 |
| S13 | −4.2782E+00 | 1.3038E+00 | −4.9850E−01 | 1.5574E−01 | −4.7744E−02 |
| S14 | −2.9148E+00 | 6.5381E−01 | −2.2449E−01 | 1.0020E−01 | −2.7918E−02 |

| Surface number | A14 | A16 | A18 | A20 |
|---|---|---|---|---|
| S1 | 1.6510E−04 | 6.5884E−05 | 2.9588E−05 | −2.0040E−05 |
| S2 | −2.1849E−04 | 5.3255E−05 | −6.4001E−05 | −1.3125E−07 |
| S3 | −1.5592E−04 | 6.8414E−05 | −3.1205E−05 | 7.5565E−06 |
| S4 | 3.1128E−04 | 1.3939E−04 | 5.0107E−05 | 4.8767E−06 |
| S5 | −9.8960E−05 | 8.9153E−06 | 7.8814E−06 | −2.4013E−05 |
| S6 | −4.6538E−04 | 3.1855E−05 | −3.1623E−05 | −2.1568E−05 |
| S7 | −1.7297E−05 | 7.6239E−05 | −1.6417E−04 | −5.6236E−05 |
| S8 | 9.6292E−04 | 4.1729E−04 | 1.6029E−04 | 9.1827E−06 |
| S9 | −7.9086E−04 | 4.5320E−04 | 1.5202E−04 | 4.5607E−06 |
| S10 | 1.2452E−03 | 2.2177E−03 | 4.8328E−04 | −6.2954E−04 |
| S11 | 1.3742E−03 | 2.1113E−04 | 4.0717E−04 | −4.3762E−04 |
| S12 | 7.0582E−03 | 9.8372E−04 | 9.5098E−04 | −7.7587E−04 |

TABLE 16-continued

|  | | | | |
|---|---|---|---|---|
| S13 | 2.3331E−02 | −1.4366E−02 | 5.7160E−03 | −9.6350E−04 |
| S14 | 1.3325E−02 | −1.2426E−02 | 5.5870E−03 | −7.0096E−04 |

| Surface number | A22 | A24 | A26 | A28 | A30 |
|---|---|---|---|---|---|
| S1 | −8.6535E−06 | −1.0453E−05 | −3.9224E−06 | 2.5253E−06 | 1.6628E−06 |
| S2 | −1.8218E−05 | 4.2384E−06 | 8.3739E−06 | 2.8302E−06 | 6.9872E−06 |
| S3 | −5.0798E−06 | 3.5742E−07 | −1.6644E−07 | −4.9223E−06 | 2.9724E−06 |
| S4 | −3.9934E−06 | −8.2928E−06 | −9.4632E−06 | −1.6208E−05 | −7.5264E−06 |
| S5 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 |
| S7 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 |
| S11 | 0.0000E+00 | 0.0000E+00 | 0.0000E+00 | 0.0000E+00 | 0.0000E+00 |
| S12 | 0.0000E+00 | 0.0000E+00 | 0.0000E+00 | 0.0000E+00 | 0.0000E+00 |
| S13 | 0.0000E+00 | 0.0000E+00 | 0.0000E+00 | 0.0000E+00 | 0.0000E+00 |
| S14 | 0.0000E+00 | 0.0000E+00 | 0.0000E+00 | 0.0000E+00 | 0.0000E+00 |

Figure 16A:
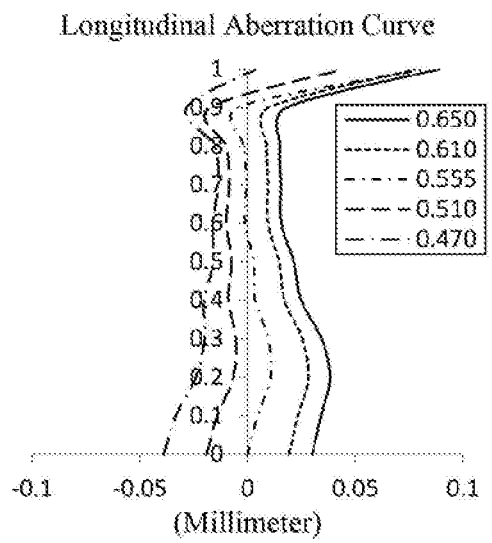
FIGS. 16A to 16D illustrate a longitudinal aberration curve, an astigmatic curve, a distortion curve, and a lateral color curve of the optical imaging system of the Example 8, respectively.
Figure 16B:
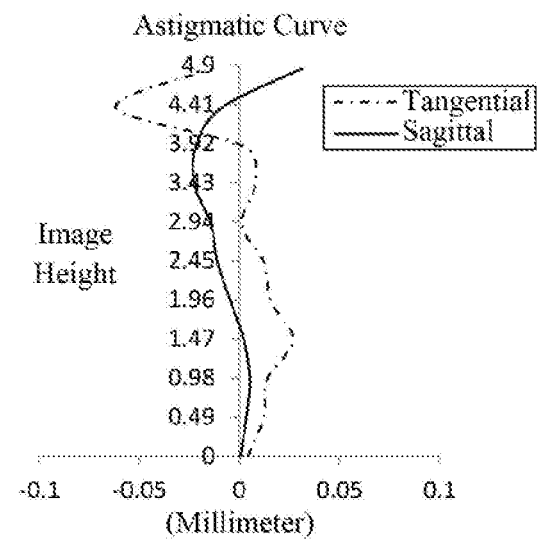
Figure 16C:
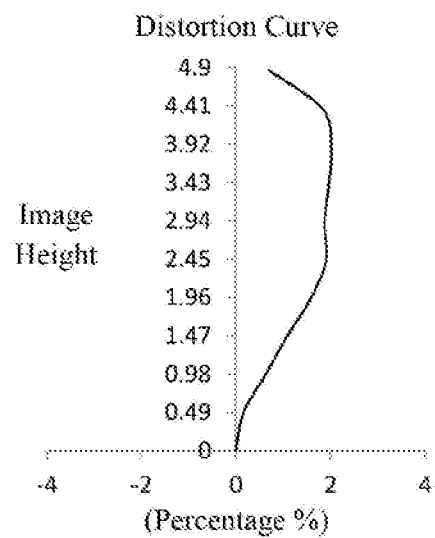
Figure 16D:
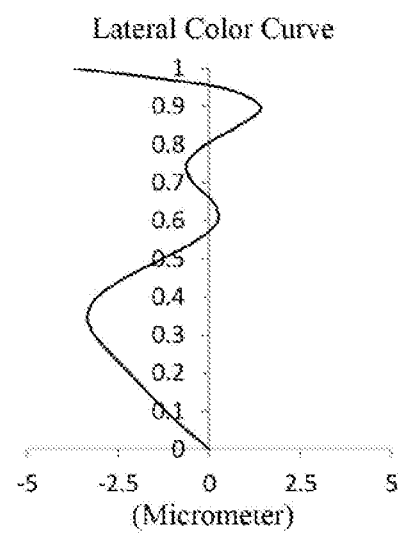

FIG. 16A illustrates a longitudinal aberration curve of the optical imaging system according to example 8, representing deviations of focal points converged by light of different wavelengths after passing through the optical imaging system. FIG. 16B illustrates an astigmatic curve of the optical imaging system according to example 8, representing a curvature of a tangential plane and a curvature of a sagittal plane. FIG. 16C illustrates a distortion curve of the optical imaging system according to example 8, representing amounts of distortion corresponding to different image heights. FIG. 16D illustrates a lateral color curve of the optical imaging system according to example 8, representing deviations of different image heights on an imaging plane after light passes through the optical imaging system. It can be seen from FIG. 16A to FIG. 16D that the optical imaging system provided in example 8 may achieve good image quality.

In view of the above, examples 1 to 8 respectively satisfy the relationship shown in Table 17.

TABLE 17

| Condition | Example | | | | | | | |
|---|---|---|---|---|---|---|---|---|
|  | 1 | 2 | 3 | 4 | 5 | 6 | 7 | 8 |
| f/EPD | 1.50 | 1.48 | 1.48 | 1.48 | 1.48 | 1.48 | 1.48 | 1.49 |
| T23*10/R4 | 0.68 | 0.69 | 0.45 | 0.45 | 0.45 | 0.54 | 0.71 | 1.63 |
| f2/f4 | −0.35 | −0.38 | −0.41 | −0.36 | −0.36 | −0.15 | −0.18 | −0.31 |
| R11/f | 0.43 | 0.43 | 0.49 | 0.52 | 0.53 | 0.54 | 0.53 | 0.56 |
| TTL/ImgH | 1.37 | 1.36 | 1.36 | 1.37 | 1.37 | 1.37 | 1.37 | 1.38 |
| f*tan(Semi-FOV) (mm) | 4.86 | 4.85 | 4.85 | 4.82 | 4.82 | 4.83 | 4.83 | 4.82 |
| DT51/DT71 | 0.59 | 0.59 | 0.61 | 0.60 | 0.60 | 0.57 | 0.56 | 0.60 |
| DT41/DT42 | 0.90 | 0.90 | 0.89 | 0.89 | 0.89 | 0.88 | 0.88 | 0.91 |
| SAG61/SAG62 | 0.92 | 0.93 | 0.91 | 0.92 | 0.92 | 0.60 | 0.60 | 0.98 |
| (R14 − R13)/f7 | 0.18 | 0.20 | 0.32 | 0.33 | 0.33 | 0.38 | 0.39 | 0.24 |
| R1/R2 | 0.25 | 0.24 | 0.31 | 0.31 | 0.30 | 0.39 | 0.40 | 0.27 |
| (R3 − R4)/(R3 + R4) | 0.36 | 0.36 | 0.47 | 0.48 | 0.48 | 0.26 | 0.20 | 0.15 |
| f/f1 | 0.95 | 0.95 | 0.89 | 0.89 | 0.89 | 0.80 | 0.78 | 0.93 |
| (CT2 + CT3)/(CT4 + CT5) | 0.62 | 0.60 | 0.51 | 0.52 | 0.52 | 0.66 | 0.68 | 0.50 |
| CT6/CT1 | 0.54 | 0.53 | 0.53 | 0.53 | 0.53 | 0.74 | 0.75 | 0.48 |
| T45/T67 | 0.63 | 0.64 | 0.74 | 0.74 | 0.73 | 0.59 | 0.55 | 0.80 |

The present disclosure further provides an imaging apparatus provided with an electronic photosensitive element for imaging. The photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the protected scope of the present disclosure is not limited to the technical solutions formed by the particular combinations of the above technical features. The protected scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, comprising: a first lens, a second lens, a third lens, a fourth lens, a fifth lens, a sixth lens and a seventh lens, which are sequentially arranged from an object side to an image side of the optical imaging system along an optical axis, wherein, $f/EPD \leq 1.5$;

$0.3 < T23*10/R4 < 1.8$;

$0.5 < SAG61/SAG62 < 1$;

$-0.6 < f2/f4 < -0.1$; and $TTL/ImgH < 1.4$, where f is an effective focal length of the optical imaging system, EPD is an entrance pupil diameter of the optical imaging system, T23 is a spaced interval between the second lens and the third lens along the optical axis, R4 a radius of curvature of an image-side surface of the second lens, SAG61 is an on-axis distance from an intersection of an object-side surface of the sixth lens and the optical axis to a vertex of an effective radius of the object-side surface of the sixth lens, SAG62 is an on-axis distance from an intersection of an image-side surface of the sixth lens and the optical axis to a vertex of an effective radius of the image-side surface of the sixth lens, f2 is an effective focal length of the second lens, f4 is an effective focal length of the fourth lens, TTL is a distance along the optical axis from an object-side surface of the first lens to an imaging plane of the optical imaging system, and ImgH is half of a diagonal length of an effective pixel area on the imaging plane.

2. The optical imaging system according to claim 1, wherein,
the first lens has positive refractive power, the object-side surface of the first lens is convex and an image-side surface of the first lens is concave;
the second lens has negative refractive power, an object-side surface of the second lens is convex, and the image-side surface of the second lens is concave;
the third lens has positive refractive power;
the fourth lens has positive refractive power, and an object-side surface of the fourth lens is convex;
an object-side surface of the sixth lens is convex, and an image-side surface of the sixth lens is concave; and
the seventh lens has negative refractive power, an object-side surface of the seventh lens is convex, and an image-side surface of the seventh lens is concave.

3. The optical imaging system according to claim 1, wherein f*tan(Semi-FOV)>4.5 mm,
where f is the effective focal length of the optical imaging system, and Semi-FOV is half of a maximal field-of-view of the optical imaging system.

4. The optical imaging system according to claim 1, wherein 0.3<DT51/DT71<0.8,
where DT51 is a maximum effective radius of an object-side surface of the fifth lens, and DT71 is a maximum effective radius of an object-side surface of the seventh lens.

5. The optical imaging system according to claim 1, wherein 0.7<DT41/DT42<1.2,
where DT41 is a maximum effective radius of an object-side surface of the fourth lens and DT42 is a maximum effective radius of an image-side surface of the fourth lens.

6. The optical imaging system according to claim 1, wherein 0.1<(R14−R13)/f7<0.6,
where f7 is an effective focal length of the seventh lens, R13 is a radius of curvature of an object-side surface of the seventh lens and R14 is a radius of curvature of an image-side surface of the seventh lens.

7. The optical imaging system according to claim 1, wherein 0.1<R1/R2<0.6,
where R1 is a radius of curvature of the object-side surface of the first lens and R2 is a radius of curvature of an image-side surface of the first lens.

8. The optical imaging system according to claim 1, wherein 0.1<(R3−R4)/(R3+R4)<0.6,
where R3 is a radius of curvature of an object-side surface of the second lens and R4 is the radius of curvature of the image-side surface of the second lens.

9. The optical imaging system according to claim 1, wherein 0.5<f/f1<1.5,
where f is the effective focal length of the optical imaging system and f1 is an effective focal length of the first lens.

10. The optical imaging system according to claim 1, wherein 0.3<(CT2+CT3)/(CT4+CT5)<0.8,
where CT2 is a center thickness of the second lens along the optical axis, CT3 is a center thickness of the third lens along the optical axis, CT4 is a center thickness of the fourth lens along the optical axis, and CT5 is a center thickness of the fifth lens along the optical axis.

11. The optical imaging system according to claim 1, wherein 0.3<CT6/CT1<0.8,
where CT1 is a center thickness of the first lens along the optical axis, and CT6 is a center thickness of the sixth lens along the optical axis.

12. The optical imaging system according to claim 1, wherein 0.5<T45/T67<1,
where T45 is a spaced interval between the fourth lens and the fifth lens along the optical axis, and T67 is a spaced interval between the sixth lens and the seventh lens along the optical axis.

13. The optical imaging system according to claim 1, wherein, $$0.3<R11/f<0.8;$$

where f is an effective focal length of the optical imaging system, R11 is a radius of curvature of an object-side surface of the sixth lens.

14. The optical imaging system according to claim 13, wherein,
the first lens has positive refractive power, the object-side surface of the first lens is convex and an image-side surface of the first lens is concave;
the second lens has negative refractive power, an object-side surface of the second lens is convex, and an image-side surface of the second lens is concave;
the third lens has positive refractive power;
the fourth lens has positive refractive power, and an object-side surface of the fourth lens is convex;
the object-side surface of the sixth lens is convex, and an image-side surface of the sixth lens is concave; and
the seventh lens has negative refractive power, an object-side surface of the seventh lens is convex, and an image-side surface of the seventh lens is concave.

15. The optical imaging system according to claim 13, wherein f*tan(Semi-FOV)>4.5,
where f is the effective focal length of the optical imaging system, and Semi-FOV is half of a maximal field-of-view of the optical imaging system.

16. The optical imaging system according to claim 13, wherein 0.5<SAG61/SAG62<1,
where SAG61 is an on-axis distance from an intersection of the object-side surface of the sixth lens and the optical axis to a vertex of an effective radius of the object-side surface of the sixth lens, and SAG62 is an on-axis distance from an intersection of an image-side surface of the sixth lens and the optical axis to a vertex of an effective radius of the image-side surface of the sixth lens.

17. The optical imaging system according to claim 13, wherein 0.1<(R14−R13)/f7<0.6,
where f7 is an effective focal length of the seventh lens, R13 is a radius of curvature of an object-side surface of the seventh lens, and R14 is a radius of curvature of an image-side surface of the seventh lens.

18. The optical imaging system according to claim 13, wherein 0.5<f/f1<1.5,
where f is the effective focal length of the optical imaging system, and f1 is an effective focal length of the first lens.

19. The optical imaging system according to claim 13, wherein 0.3<(CT2+CT3)/(CT4+CT5)<0.8,
where CT2 is a center thickness of the second lens along the optical axis, CT3 is a center thickness of the third lens along the optical axis, CT4 is a center thickness of the fourth lens along the optical axis, and CT5 is a center thickness of the fifth lens along the optical axis.

\* \* \* \* \*